US010594593B2

(12) United States Patent
Saffre et al.

(10) Patent No.: US 10,594,593 B2
(45) Date of Patent: Mar. 17, 2020

(54) METHODS AND APPARATUS FOR TRANSMITTING DATA

(71) Applicant: BRITISH TELECOMMUNICATIONS PUBLIC LIMITED COMPANY, London (GB)

(72) Inventors: Fabrice Saffre, London (GB); Anne-Louise Krug, London (GB)

(73) Assignee: BRITISH TELECOMMUNICATIONS PUBLIC LIMITED COMPANY, London (GB)

(*) Notice: Subject to any disclaimer, the term of this patent is extended or adjusted under 35 U.S.C. 154(b) by 0 days.

(21) Appl. No.: 16/086,642

(22) PCT Filed: Mar. 21, 2017

(86) PCT No.: PCT/EP2017/056714
§ 371 (c)(1),
(2) Date: Sep. 20, 2018

(87) PCT Pub. No.: WO2017/167607
PCT Pub. Date: Oct. 5, 2017

(65) Prior Publication Data
US 2019/0089621 A1   Mar. 21, 2019

(30) Foreign Application Priority Data
Mar. 29, 2016  (EP) .................................. 16162721

(51) Int. Cl.
*H04L 12/715* (2013.01)
*H04L 12/721* (2013.01)
(Continued)

(52) U.S. Cl.
CPC ............. *H04L 45/04* (2013.01); *H04L 45/12* (2013.01); *H04L 45/127* (2013.01); *H04L 45/70* (2013.01);
(Continued)

(58) Field of Classification Search
CPC ..... H04L 45/04; H04L 47/72; H04L 47/2483; H04L 47/225; H04L 47/11; H04L 45/127; H04L 45/12; H04L 45/70; H04L 45/10
(Continued)

(56) References Cited

U.S. PATENT DOCUMENTS

| 5,694,394 A | 12/1997 | Shinohara |
| 6,538,989 B1 * | 3/2003 | Carter ................... H04L 47/521 370/229 |

(Continued)

FOREIGN PATENT DOCUMENTS

| WO | 2016/101972 | 6/2016 |
| WO | 2016/105816 | 6/2016 |
| WO | WO-2016101972 A1 * | 6/2016 ......... H04L 65/1016 |

OTHER PUBLICATIONS

International Search Report and Written Opinion of the ISA for PCT/EP2017/056714, dated Jun. 12, 2017, 13 pages.
(Continued)

*Primary Examiner* — Hassan A Phillips
*Assistant Examiner* — Mohammed S Chowdhury
(74) *Attorney, Agent, or Firm* — Nixon & Vanderhye PC

(57) ABSTRACT

Methods and apparatus are disclosed for transmitting flows of data units across a data communication network from a transmitting node towards an intended destination via one or more intermediate nodes, the data units having destination indications, the intermediate nodes being configured to receive data units, identify therefrom a transmission mode that has been selected from at least two transmission modes for the data units, and forward the data units according to the selected transmission mode. The method involves selecting a transmission mode for the flow in dependence on an estimate of the difference in the amount of a resource required to transmit the flow by one or the other transmission mode, a resource-usage measure indicative of the amount of (Continued)

A Data Communication Network the resource required to identify a route and reserve sufficient capacity thereon for transmission of the flow, and a probability measure indicative of a likelihood of success of an attempt to identify and reserve sufficient capacity for the flow.

20 Claims, 9 Drawing Sheets

(51) Int. Cl.
- *H04L 12/801* (2013.01)
- *H04L 12/815* (2013.01)
- *H04L 12/851* (2013.01)
- *H04L 12/911* (2013.01)
- *H04L 12/751* (2013.01)

(52) U.S. Cl.
CPC ............ *H04L 47/11* (2013.01); *H04L 47/225* (2013.01); *H04L 47/2483* (2013.01); *H04L 47/72* (2013.01); *H04L 45/10* (2013.01)

(58) Field of Classification Search
USPC ........................................................ 370/315
See application file for complete search history.

(56) References Cited

U.S. PATENT DOCUMENTS

| | | | |
|---|---|---|---|
| 2003/0039237 A1* | 2/2003 | Forslow | ................ H04L 63/083 370/352 |
| 2005/0226026 A1 | 10/2005 | Linares et al. | |
| 2007/0136473 A1 | 6/2007 | Birchler et al. | |
| 2010/0195643 A1 | 8/2010 | Kodali et al. | |
| 2015/0071282 A1 | 3/2015 | Anders et al. | |

OTHER PUBLICATIONS

Combined Search and Examination Report for GB1605256.5, dated Oct. 25, 2016, 5 pages.

Extended Search Report for EP16162721.1, dated Sep. 20, 2016, 10 pages.

Lawrence G. Roberts: "A Radical New Router": http://spectrum.ieee.org/computing/networks/a-radical-new-router/0—the attached copy, posted Jul. 1, 2009, obtained on Jan. 4, 2016, 4 pages.

A Wikipedia page entitled "UMTS Channels", available at http://en.wikipedia.org/wild/UMTS_channels, obtained on Jan. 4, 2016, 2 pages.

* cited by examiner

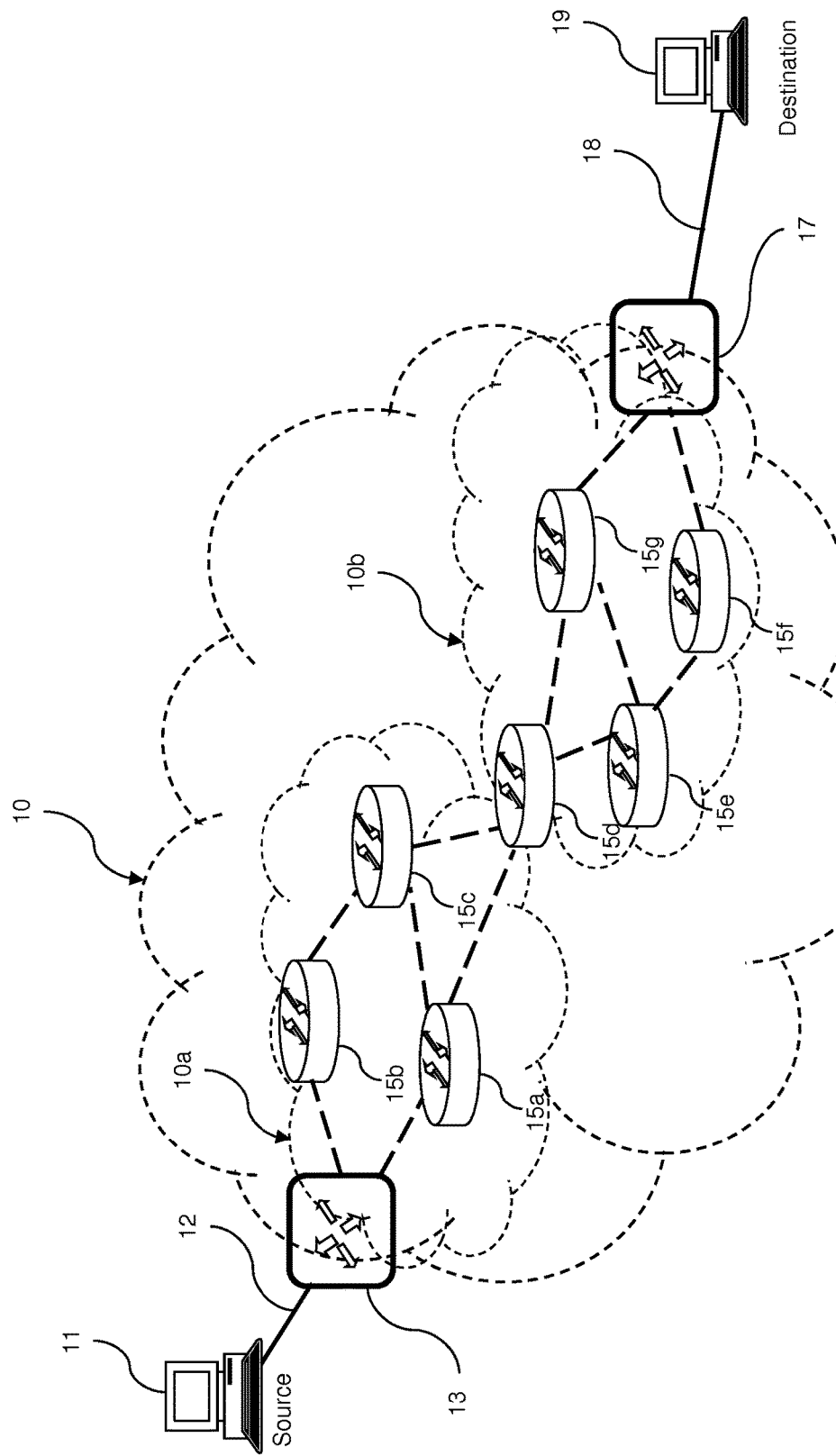
Figure 1 - A Data Communication Network

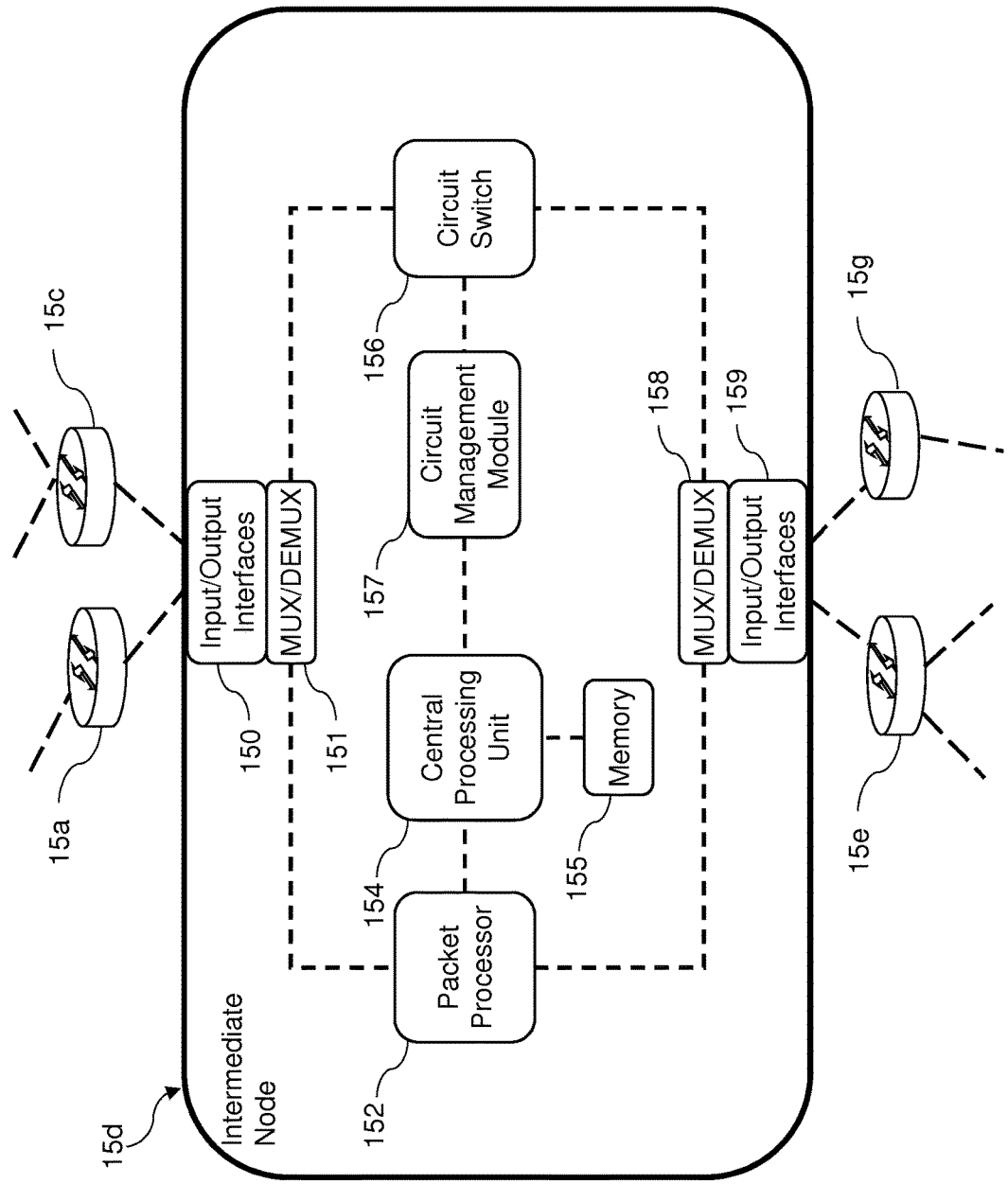
Figure 2 - An Intermediate Node

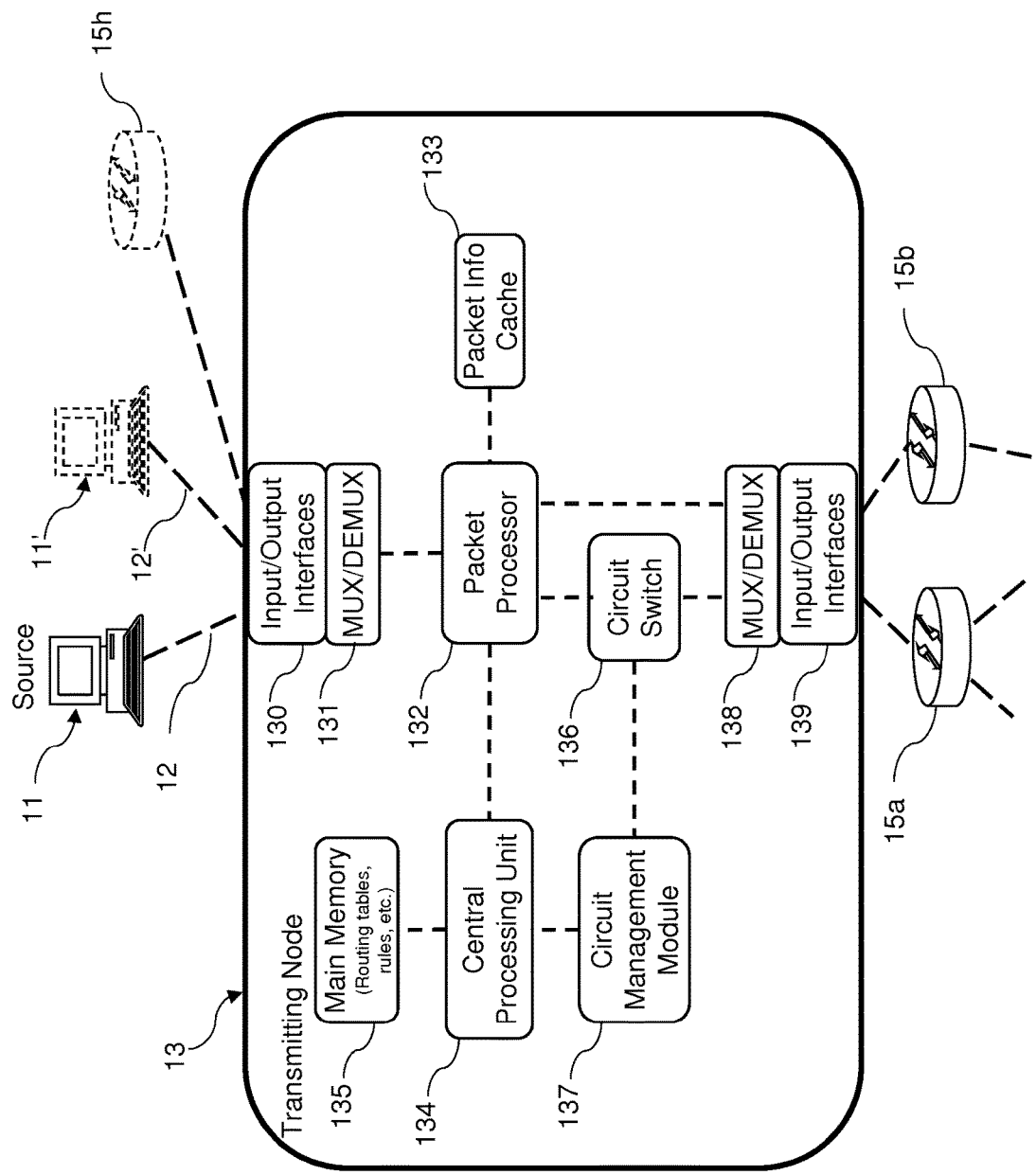
Figure 3 - A Transmitting Node

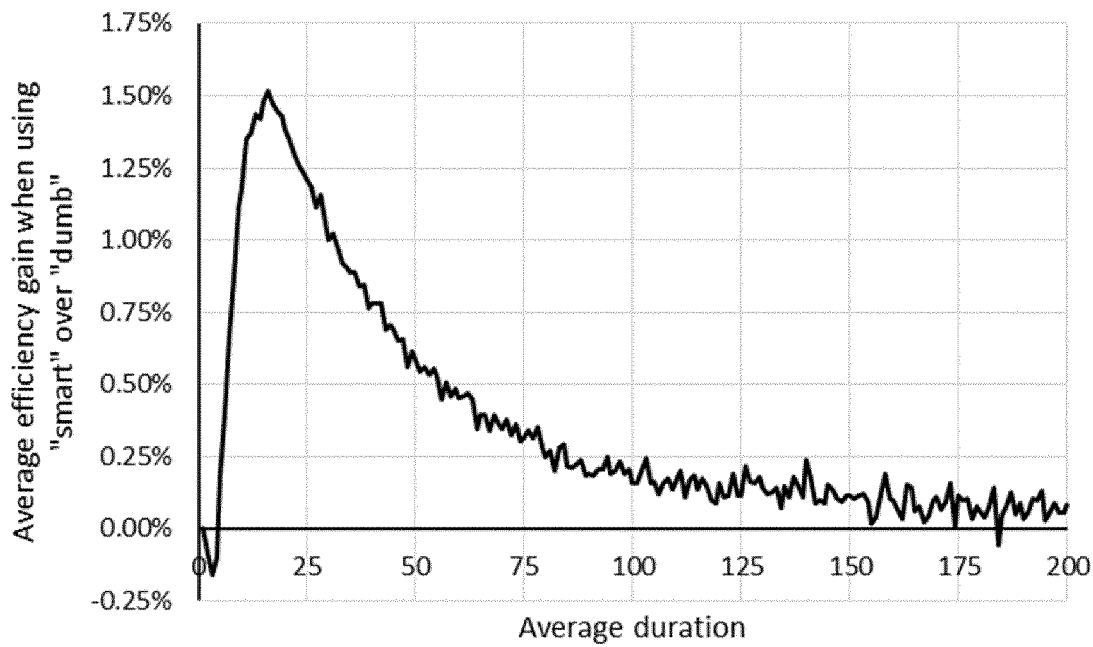
Figure 4: Efficiency gain, "smart" vs. "dumb" decision engine
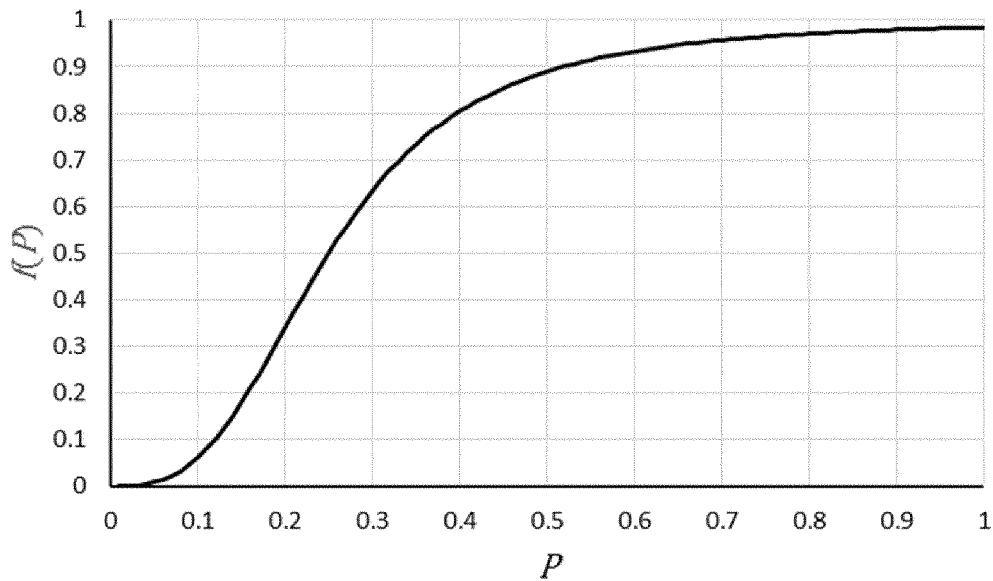
Figure 5: Modifier for the "SuperSmart" decision function

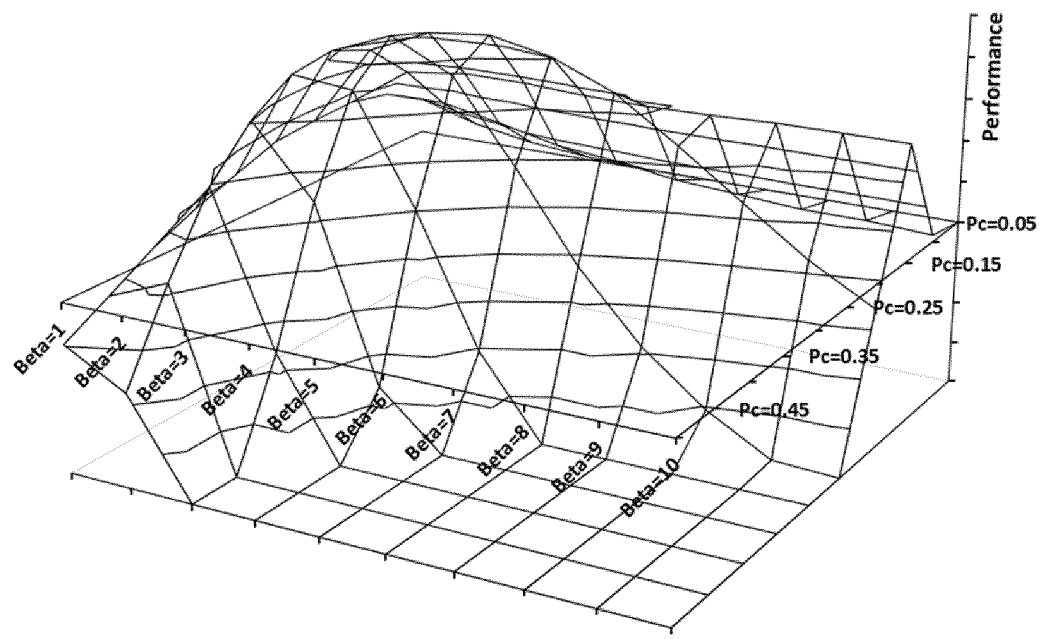
Figure 6: Performance variation in the Pc x β space
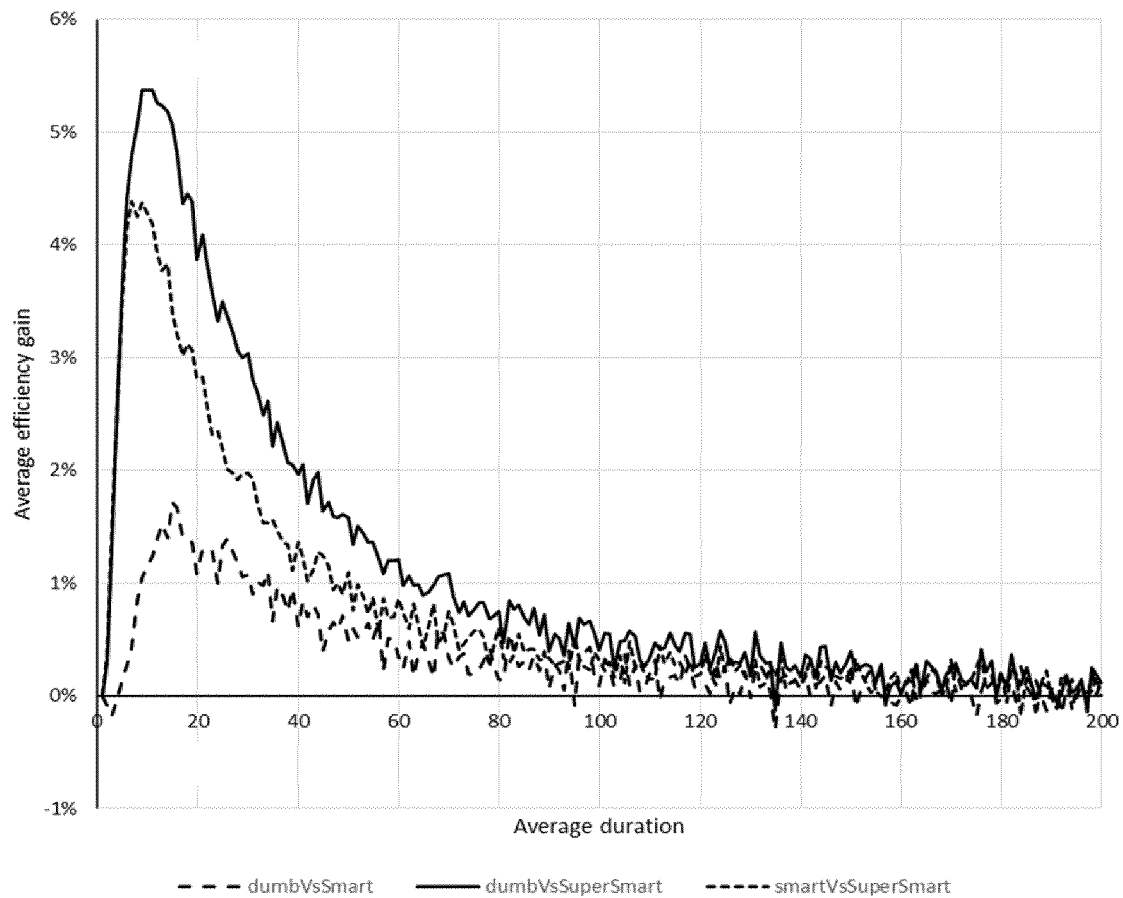
Figure 7: Efficiency gain comparisons

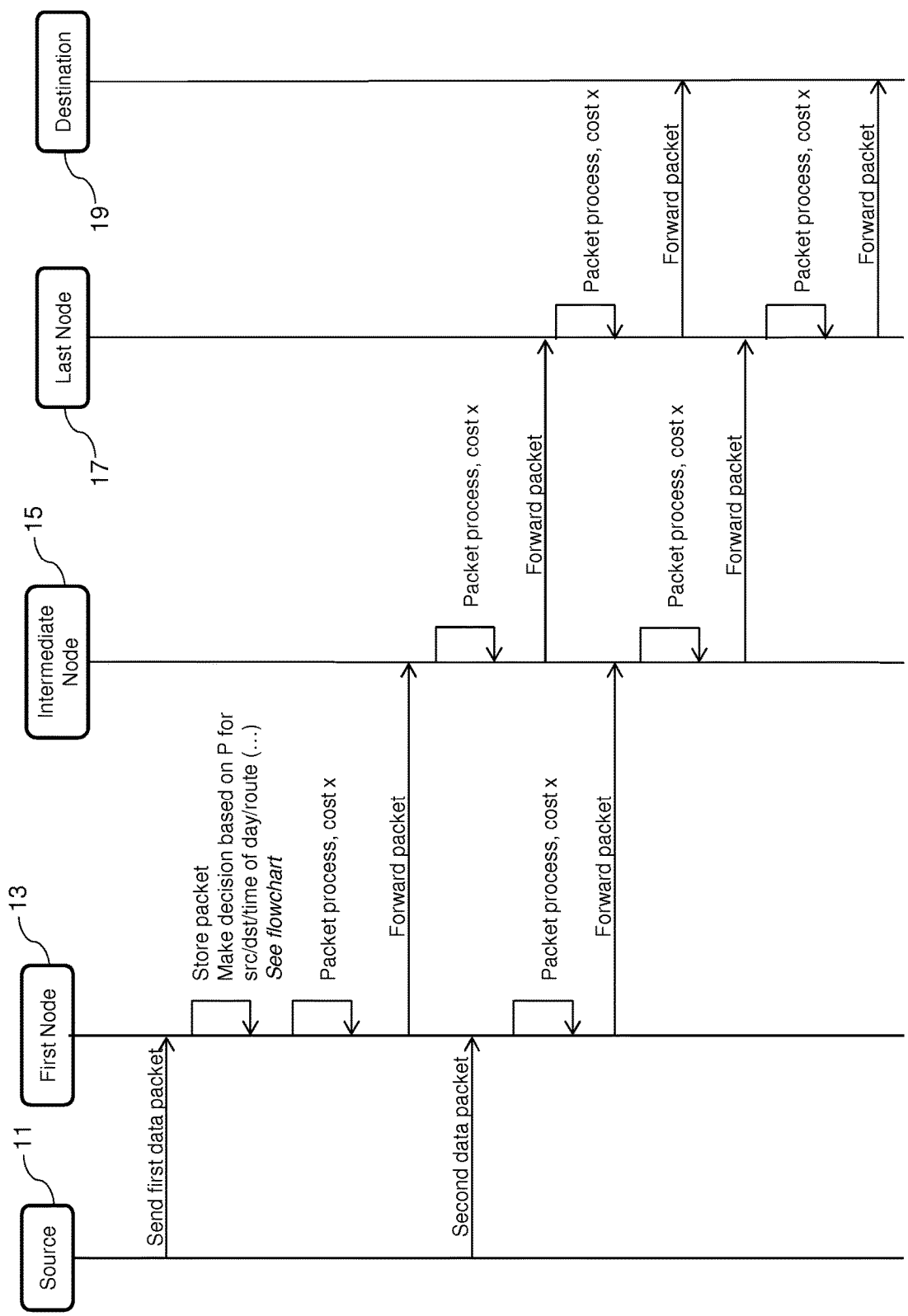
Figure 9: Where P is known for the time period and this results in decision to use packet transmission

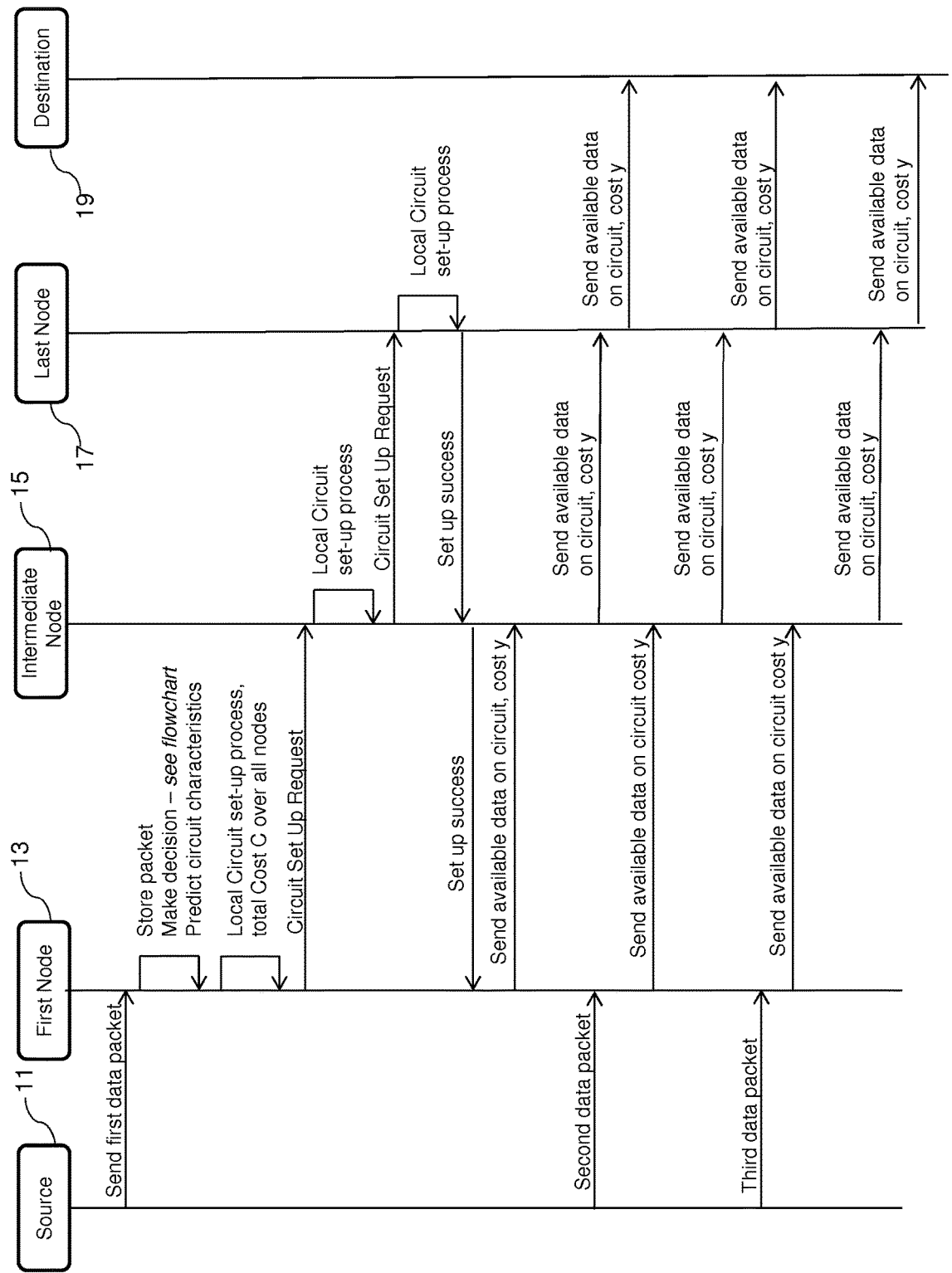
Figure 10: Where P is known for the time period and this results in decision to set up and use circuit

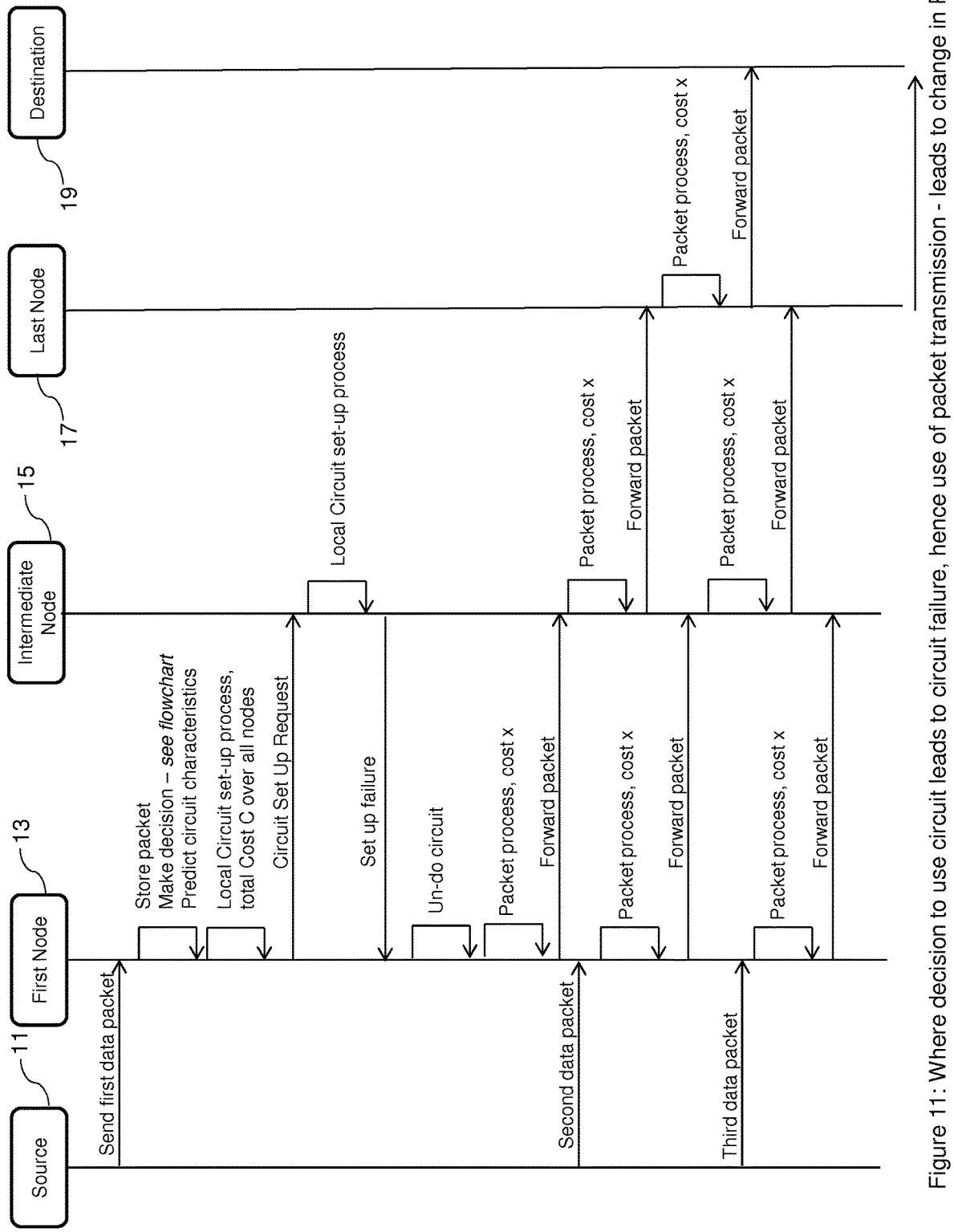
Figure 11: Where decision to use circuit leads to circuit failure, hence use of packet transmission - leads to change in P

METHODS AND APPARATUS FOR TRANSMITTING DATA

This application is the U.S. national phase of International Application No. PCT/EP2017/056714 filed 21 Mar. 2017, which designated the U.S. and claims priority to EP Patent Application No. 16162721.1 filed 29 Mar. 2016, the entire contents of each of which are hereby incorporated by reference.

TECHNICAL FIELD

The present invention relates to methods and apparatus for transmitting flows of data units across data communication networks.

BACKGROUND

Circuit-Switching and Packet-Switching

Broadly speaking, communications networks transmit data according to either or both of two modes of transmission, which are usually referred to as circuit-switching and packet-switching. Some networks (and the nodes of which they are comprised) are configured to perform just one of these transmission modes; other networks may be configured to perform both, either by virtue of having nodes capable of performing both modes of transmission or by including some nodes capable of performing each mode of transmission.

An example of a circuit-switching network is the traditional telephone network, in which a telephone line (i.e. a circuit) is physically connected (i.e. switched) to another for the duration of a call. In the early days of telephony, the switching of circuits was done by human operators physically inserting connectors into sockets in order to connect lines together. Later, the switching of connections was done automatically using electromechanical switches controlled by the number dialed, and then by solid state electronics, but the result was essentially the same—a dedicated physical electrical circuit was created between two endpoints for the duration of a call. This is true even where the end-to-end path between the two end-points is made up of multiple hops on links between individual nodes, but in such cases, a circuit selection and set-up process may be required before any data is sent, in order to find the best or an appropriate series of links between the end-points that are capable of carrying the data—once a circuit has been set up, all of the data travels along the same series of reserved links.

Circuit-switching was and still is suitable for many types of real-time communication such as voice or video calls because once a circuit has been set up, it can provide guaranteed dedicated bandwidth (i.e. capacity) until the circuit is taken down again. Such a transmission mode is not always suitable for the transmission of computer data, however, in which data transmission often happens in short bursts. Dedicated bandwidth such as that provided by circuit-switching is likely to be wasted during quiet periods between such bursts, which may be of varying and unpredictable size, and may happen at unpredictable times. For such "bursty" transmission of data, packet-switching is often a more suitable transmission.

Packet-switching is a group of digital network communication techniques in which data to be transmitted is grouped into suitably-sized units, called packets, which are transmitted via a medium that may be shared by multiple simultaneous communication sessions or flows.

Generally, packets are composed of a header and a payload. Information in the header is used by networking hardware (i.e. routers or other types of nodes) to direct the packet to its intended destination, at which the payload may be extracted and used.

With packet switching a single physical link between two points can be used to carry data for different users at different times, thereby avoiding the potential waste of capacity that would result if bursty traffic were being sent on a reserved link. Also by splitting the data up into small chunks (i.e. packets) and routing or switching each one separately at each intermediate node, fault resilience can be built in as each packet can take a different route, thereby by-passing problems before the data is re-assembled if/when the chunks reach the intended receiver. The packets making up a flow (where the term flow is generally used to denote a stream of packets produced by a given application and transmitted from a particular sender towards a particular destination with a particular QoS requirement) may all traverse the same route (i.e. the series of routers or intermediate nodes between the sender and the destination), but this need not be the case, and if network conditions at particular nodes, on particular links, or overall are such that packets of the flow are better traversing the network by a number of different routes, the intermediate nodes on those routes will obtain the necessary information from the headers of the packets they receive to enable them to forward them on appropriately via those routes such that they should eventually reach and be reassembled at the intended destination. Packet-switching can therefore increase efficiency and robustness in networks, and can enable many different applications to operate within the same network.

Connection-Oriented and Connectionless Communication

As will now be explained, packet-switching technologies can themselves be split into two types of packet-switching technologies referred to as "Connection-Oriented" and "Connectionless", meaning that resource sharing of a network can generally be regarded as being managed according to one of three main types of technique, with the following characteristics:

(i) Connection-Oriented Circuit-Switched (CO-CS), e.g. PSTN, SONET/SDH, WDM:
  A path with reserved resources is established before any data can be sent
  A path can be identified through e.g. wavelength, signal code or timeslot
  Resource allocation is guaranteed, even if no data is being sent
  Data needs only minimal labelling (ii) Connectionless Packet-Switched (CL-PS), e.g. Internet Protocol (IP), SS7:
  Each packet carries complete information about the intended destination (and generally about the source as well) such that the route (or the next hop thereof, at least) may be determined only once the packet has arrived at a switching point.
  This gives maximum flexibility enabling resources to be fully utilised.
  Routing around failures is possible.

(iii) Connection-Oriented Packet-Switched (CO-PS), e.g. Multiprotocol Label Switching (MPLS):
  A fixed path is established before data is sent.
  Short labels can be used.
  The order of packets is maintained through transmission.
  Unlike the CO-CS case, any time-sharing of the physical path is irregular in nature.

Of these three, it will be noted that two of them (CO-CS and CO-PS) involve the establishment of an end-to-end path before data is sent, whereas the other (CL-PS) does not.

Energy Considerations:

Energy usage in a modern data communications network such as a packet network is generally dominated by the energy consumption of its routers or switches. The energy use of routers generally depends on the nature of the traffic and type of resource management that is used.

High speed routers generally have significant energy consumption nowadays because they function at least primarily as packet switches. This means that they need to process every packet they receive. Each packet needs to carry full addressing information in its header, and at every router, the header needs to be processed, generally for error handling, hop count, address look-up and route determination processes. Also, each packet is typically buffered during processing and while awaiting onwards transmission, so queuing control needs to be provided. All these overheads were historically justified because of the statistical gains that were achieved because computer traffic tended to consist (at least mainly) of delay-insensitive data messages or short flows with long gaps between them. However, nowadays, transmission is cheap and traffic is predominantly long-hold high-bandwidth video with increasing levels of delay-sensitive traffic such as low bandwidth voice and high bandwidth cloud gaming. This means that a traditional packet network is unlikely to be the best solution for all traffic. Traffic has a very diverse nature, from high-bandwidth, constant bit-rate video services to highly irregular short messages, for example, as associated with the "Internet of Things".

The following table (Table 1) compares the three main network resource-management or resource-sharing systems from the perspective of energy use.

costly, and power hungry, and proposes a way to fix this based on the idea of reducing the need for complex header processing at each router by doing one full look-up per flow and storing the results in a cheap-to-access hash table.

Circuit and packet network modes ran in parallel within some early 3G networks, a summary of which is available at http://en.wikipedia.org/wiki/UMTS_channels, and which were governed by various 3G standards available online and elsewhere. One channel (the common packet channel, CPCH) was left open for terminals to use for intermittent packet data, whilst the remaining capacity was to be used for circuit based transmission only.

United States application US2003039237 (Forslow) relates to mobile communications, and to different services and features that may be employed to establish and enhance communications between a mobile station in a mobile communications network and an external network entity.

United States application US2015071282 (Anders et al) relates to techniques and mechanisms for performing circuit-switched and packet-switched routing for network communication.

U.S. Pat. No. 6,538,989 (Carter et al) relates to packet networks, and to an approach which provides both bounded-delay and best-effort operation in a packet network node. The bounded-delay mode is capable of providing a firm end-to-end delay bound. Network nodes are provided with dual packet buffers associated with bounded-delay and best-effort classes of service respectively. Appropriate dimensioning, if necessary enforced through connection admission control (CAC) methods, may ensure that packets admitted to the bounded-delay buffer are provided the firm delay bound. CAC methods are described which are applicable for packet flows as small as a single packet.

The replacement of circuit-based transmission by packet-switching has however been a cornerstone of modern data

TABLE 1

Energy Usage of Main Network Modes of Operation

| Mode | Control Cost | Switching Cost | Transmission Cost |
| --- | --- | --- | --- |
| CO-CS | One-off costs to establish the path, so ideal for long-hold sessions. No on-going overhead | Lowest because no buffering required. Switching operation at timescales of circuit | Lowest when there is high utilisation from predictable traffic, e.g. streamed. |
| CL-PS | Per-packet processing and per-packet overhead. Ideal for single messages | Highest, to accommodate different packet sizes. Large buffers required | Utilisation is typically under 50% to manage Quality of Service (QoS), increasing transmission costs |
| CO-PS | Need to establish path and label each packet | Less processing than the CL-PS case to forward a packet and typically smaller buffers | If admission control is used, high utilisations may be achievable |

Most networks support alternative traffic modes as overlays. Thus an IP CL-PS network may be overlaid onto the CO-CS circuit switched wavelength-division multiplexing (WDM) network and a connection oriented flow (CO-PS) may be supported over IP through use of Transmission Control Protocol (TCP). The disadvantages of this approach include that this is less flexible in response to different traffic types, and energy consumption would be higher than a parallel-mode network as processing for each layer must take place.

Looking now at specific prior techniques and proposals, a paper entitled "A Radical New Router" by Lawrence G. Roberts posted online in July 2009 on the IEEE Spectrum website: http://spectrum.ieee.org/computing/netorks/a-radical-new-router/0 argues that network routers are too slow, networks. When the Internet started to develop, data files were generally of relatively modest size, and processing was both cheap and quickly becoming much faster, whilst transmission was expensive, meaning that packet-switching was the natural and most efficient solution for moving data.

Nowadays, however, streaming of large volumes of media content (e.g. audio or video content) between one source and one target over a period of time represents an increasing proportion of all data traffic. Simultaneously, improvements to speed and efficiency in processing technology are slowing down. This means that the conditions could be such that the establishment of a circuit between the source and the destination may once again become more efficient than packet-switching. This is because, once established, such an end-to-end circuit is more resource-efficient (i.e. the main cost is paid upfront, when the circuit is created). Correspondingly, the conditions could be such that transmission between the source and the destination using a connection-oriented packet-switched (i.e. CO-PS) transmission mode may be more efficient than using a connectionless packet-switched (i.e. CL-PS) transmission mode. Similarly, this may be because, once a path has been established that will be suitable for connection-oriented transmission, using such an established path is generally more resource-efficient than using a connectionless transmission mode requiring per-packet processing and per-packet overhead (i.e. similarly, a main cost is paid upfront when the path is established).

For some types of traffic, such as that composed of short messages or intermittent data, however, the overheads of circuit or path establishment may prove a significant energy cost.

Therefore, to allow a network to offer the most energy-efficient options for transmitting different types of data in different scenarios, it should be capable of providing circuit-switched and packet-switched transmission modes as parallel services within the same infrastructure and/or of providing connection-oriented and connectionless transmission modes as parallel services within the same infrastructure, and of being able to ascertain which option should be chosen in individual cases.

SUMMARY OF THE INVENTION

According to a first aspect of the invention, there is provided a method of transmitting a flow comprising a plurality of data units across a data communication network from a transmitting node towards an intended destination via one or more of a plurality of intermediate nodes, data units of the flow having respective indications of an intended destination for data units of the flow, the intermediate nodes of the network being configured to receive data units, to identify from a characteristic of received data units a transmission mode that has been selected from at least two transmission modes for the data units, and to forward said data units according to the selected transmission mode, the transmission modes comprising:

a first transmission mode according to which a predetermined header portion of a received data unit is inspected following receipt by an intermediate node whereby to obtain the indication of the intended destination for the received data unit, and whereby the received data unit is then forwarded by said intermediate node to a subsequent node selected by the intermediate node in dependence on the obtained indication of the intended destination; and a second transmission mode according to which a characteristic of a received data unit signals to intermediate nodes that the data unit is to be forwarded to a subsequent node on an already-identified route identified in dependence on the intended destination for data units of the flow, and whereby the received data unit is forwarded by each intermediate node to a subsequent node on the identified route;

the method comprising:

in respect of one or more data units of a flow to be transmitted from the transmitting node, obtaining a measure of the estimated difference between the amount of a predetermined resource required to transmit the data units of the flow from the transmitting node to the intended destination according to the first transmission mode and the amount of the predetermined resource required to transmit the data units of the flow from the transmitting node to the intended destination according to the second transmission mode;

at a processor associated with the transmitting node, selecting a transmission mode for the data units of the flow, the selection being made in dependence on the obtained measure of the estimated difference, a resource-usage measure indicative of an estimated amount of the predetermined resource required to be used in an attempt to identify a route from the transmitting node to the intended destination and reserve sufficient capacity on said route for transmission of said flow according to said second transmission mode, and a probability measure indicative of a likelihood of success of an attempt to identify and reserve sufficient capacity on a route from the transmitting node to the intended destination; and in the event that the first transmission mode is selected, forwarding data units of the flow received by the transmitting node to one or more intermediate nodes with the indication of the intended destination in the predetermined header portion of said data units, for subsequent forwarding according to the first transmission mode; and in the event that the second transmission mode is selected, initiating a route-identification process to identify and reserve sufficient capacity on a route from the transmitting node towards the intended destination for transmission of the data units of the flow according to the second transmission mode.

If the second transmission mode is selected, the method may further involve forwarding data units of the flow according to the second transmission mode, subject to the route-identification process resulting in a route being identified and sufficient capacity being reserved thereon. As will be appreciated, however, the method has been determined specifically to take account of the possibility that an attempt to identify and reserve sufficient capacity on a route from the transmitting node to the intended destination may fail even if the second transmission mode is initially selected, in which case data units may be forwarded according to the first transmission mode after all, despite the second transmission mode initially having been selected.

If the second transmission mode is initially selected, the route-identification process may involve testing a route and selecting it as long as it meets certain criteria, or it may involve testing a number of potential routes, and selecting one that best meets certain criteria, for example. As will become apparent, the route-identification process may also involve exchanges of messages between nodes on the route in order to determine the manner in which each node is to signal to its subsequent node on the route that respective data units are to be treated as part of the flow in respect of which the route has been identified.

Methods according to preferred embodiments may be performed for example by or on behalf of a node such as an Internet router acting as a transmitting node, which itself may be acting as an attachment point to a network for a source node from which it receives data, or as a network gateway device to a user network such as a Local Area Network (LAN).

Using preferred embodiments of the above method, a transmitting node may select an appropriate transmission mode for a flow from plural transmission modes including at least one first (e.g. "connectionless") transmission mode (such as a "connectionless packet-switched" ("CL-PS") transmission mode) in which there are no significant route set-up costs and at least one second (e.g. "connection-oriented") transmission mode (such as a "connection-oriented circuit-switched" ("CO-CS") transmission mode, or such as a "connection-oriented packet-switched" ("CO-PS") transmission mode) in which there are significant route set-up costs, based on criteria available to and indicative to the transmitting node of which mode is likely to offer a more (or the most) energy-efficient (or other resource-efficient) option for transmitting different types of data in different scenarios, taking account of the probability that even if a connection-oriented (circuit-switched or packet-switched) transmission mode should be the more (or the most) appropriate transmission mode, an attempt to select such a route may fail, having already resulted in an unrecoverable amount of the resource in question being used in making a failed attempt to identify and reserve sufficient capacity on one or more such routes.

According to preferred embodiments, the measure of the estimated difference may be obtained based on a first value indicative of an estimated rate of usage of the predetermined resource if transmitting the data flow according to the first transmission mode, a second value indicative of an estimated rate of usage of said predetermined resource if transmitting the data flow according to the second transmission mode, and an estimated time period required for the data flow to be transmitted when using the first and/or second transmission modes. Respective estimated time periods may be used for the respective modes in scenarios where the duration of the transmission might be mode-dependent.

Alternatively or additionally, the measure of the estimated difference may be obtained based on a first value indicative of an estimated usage of the predetermined resource per data unit if transmitting the data flow according to the first transmission mode, a second value indicative of an estimated usage of the predetermined resource per data unit if transmitting the data flow according to the second transmission mode, and an estimated number of data units in the data flow to be transmitted when using the first and/or second transmission modes. Respective estimated numbers of data units may be used for the respective modes in scenarios where the number of data units in the transmission might be mode-dependent.

Alternatively or additionally, the measure of the estimated difference may be obtained based on a first value indicative of an estimated usage of the predetermined resource per unit volume of data if transmitting the data flow according to the first transmission mode, a second value indicative of an estimated usage of the predetermined resource per unit volume of data if transmitting the data flow according to the second transmission mode, and an estimated volume of data in the data flow to be transmitted when using the first and/or second transmission modes. Respective volume estimates may be used for the respective modes in scenarios where the volume of data in the transmission might be mode-dependent.

The resource-usage measures indicative of estimated amounts of the predetermined resource required to be used in attempts to identify routes and/or the probability measure indicative of a likelihood of success may be obtained in dependence on one or more of a number of factors, including: information obtained during a training mode; information obtained from another transmitting node; information obtained from a network control entity; information obtained from transmission of one or more previous flows; information obtained from one or more unsuccessful attempts to transmit one or more previous flows; attempts to identify and reserve sufficient capacity on routes from the transmitting node to an intended destination in respect of one or more previous flows, for example. The probability measure in particular may be time-specific (e.g. the probability of successfully opening a route between a particular source and a particular destination might be high during off-peak periods, when resources are plentiful, and low at peak time, when they are scarce), for example.

The resource-usage measures indicative of estimated amounts of the predetermined resource required to be used in attempts to identify routes and/or the probability measure indicative of a likelihood of success may depend on a variety of criteria, such as whether the transmission is attempted at a peak or off-peak time, current congestion levels, or other issues. They may be dependent on criteria such as: a time period during which the transmission is requested; current or historical measures of congestion levels or other network characteristics in the network, for example.

According to preferred embodiments, the selection of a transmission mode for the data units of the flow may be made in dependence on a sigmoid function (or other non-linear function which preferably remains below the straight-line graph for a part of the range, and above for the rest) of a probability measure indicative of a likelihood of success of an attempt to identify and reserve sufficient capacity on a route from the transmitting node to the intended destination.

According to preferred embodiments, the data units are packets complying with a version of an Internet Protocol such as IPv4, or IPv6, for example.

According to preferred embodiments, the characteristic of data units of a flow used to signal to intermediate nodes that the data units of the flow are to be forwarded to subsequent nodes on an already-identified route may be a characteristic selected from: a label associated with the data units of the flow; one or more codepoints in a header portion of data units of the flow; a frequency, wavelength, timeslot, or encoding protocol used for transmission of the data units on links between nodes; a source or destination port number or address indication used for data units of the flow; or other characteristics. It will be understood that in certain embodiments, if the second transmission mode has been selected and a route has successfully been identified, the data units need not carry indications of their intended destination once on the selected route, as another characteristic may be sufficient to signal to subsequent nodes that respective data units are to be treated as part of the flow in respect of which the route has already been identified. The indications of the intended destination may thus be stripped of data units of the flow once they have been processed at the transmitting node (and added back once they reach the final node on the identified route, for example). Where the data units are IP packets, the whole of the IP header may be stripped off, and/or a new outer header with a simple label may be added. This may be done in order to increase the energy efficiency of the transmission process.

According to preferred embodiments, the predetermined resource may be a resource selected from: energy required to process data units at one or more network nodes; processing capacity at one or more processors on one or more of the network nodes; capacity on one or more links between the network nodes; a measure of a congestion allowance at network nodes and or on links between network nodes; or other resources.

According to preferred embodiments, the route-identification process initiated in the event that the second transmission mode is selected may comprise the transmitting node sending requests to nodes on one or more routes in respect of available capacity and/or other network characteristics at the nodes and/or on links between the nodes on the one or more routes, and identifying a preferred route in dependence in responses to the requests received by the transmitting node.

According to preferred embodiments, the route-identification process initiated in the event that the second transmission mode is selected may comprise the transmitting node requesting identification of a preferred route by a remote route identification entity, according to a Software Defined Network (SDN) protocol, for example.

According to preferred embodiments, the method may further comprise forwarding data units of the flow with the first transmission mode as the selected transmission mode in the event that the second transmission mode is selected and that the resulting route-identification process fails to identify and reserve sufficient capacity on a route from the transmitting node towards the intended destination for transmission of the data units of the flow according to the second transmission mode. With such embodiments, a failure to identify a circuit suitable for forwarding a flow using a connection-oriented circuit-switched transmission mode may essentially lead to the transmitting node reverting to using a connectionless packet-switched transmission mode for the flow. Similarly, a failure to identify a path suitable for forwarding a flow using a connection-oriented packet-switched transmission mode may lead to the transmitting node reverting to using a connectionless packet-switched transmission mode for the flow.

It will thus be understood that with some embodiments, the primary decision to be taken may be a decision as to whether to (a) attempt to set up a path, and if successful, use it for transmission using a circuit-switched transmission mode (e.g. CO-CS) or (b) proceed directly with a packet-switched transmission mode (e.g. CL-PS). With other embodiments, however, the primary decision to be taken may be a decision as to whether to (a) attempt to set up a path and if successful, use it for transmission using a connection-oriented transmission mode (e.g. CO-PS) or (b) proceed directly with a connectionless transmission mode (e.g. CL-PS). In either case, this decision takes account not only of the difference in ongoing resource usage between the respective transmission modes if selected and used, as well as the amount of the resource in question that may be used (but potentially "wasted") in establishing or attempting to establish a path for transmission using a connection-oriented transmission mode, but also takes account of the probability of such path-establishment costs being wasted in the event that a path-establishment attempt is unsuccessful.

According to a second aspect of the invention, there is provided apparatus for transmitting a flow comprising a plurality of data units across a data communication network from a transmitting node towards an intended destination via one or more of a plurality of intermediate nodes, data units of the flow having respective indications of an intended destination for data units of the flow, the intermediate nodes of the network being configured to receive data units, to identify from a characteristic of received data units a transmission mode that has been selected from at least two transmission modes for the data units, and to forward said data units according to the selected transmission mode, the transmission modes comprising:

a first transmission mode according to which a predetermined header portion of a received data unit is inspected following receipt by an intermediate node whereby to obtain the indication of the intended destination for the received data unit, and whereby the received data unit is then forwarded by said intermediate node to a subsequent node selected by the intermediate node in dependence on the obtained indication of the intended destination; and a second transmission mode according to which a characteristic of a received data unit signals to intermediate nodes that the data unit is to be forwarded to a subsequent node on an already-identified route identified in dependence on the intended destination for data units of the flow, and whereby the received data unit is forwarded by each intermediate node to a subsequent node on the identified route;

the apparatus comprising:

one or more processors associated with the transmitting node operable to obtain, in respect of one or more data units of a flow to be transmitted from the transmitting node, a measure of the estimated difference between the amount of a predetermined resource required to transmit the data units of the flow from the transmitting node to the intended destination according to the first transmission mode and the amount of the predetermined resource required to transmit the data units of the flow from the transmitting node to the intended destination according to the second transmission mode;

the one or more processors further being operable to select a transmission mode for the data units of the flow, the selection being made in dependence on the obtained measure of the estimated difference, a resource-usage measure indicative of an estimated amount of the predetermined resource required to be used in an attempt to identify a route from the transmitting node to the intended destination and reserve sufficient capacity on said route for transmission of said flow according to said second transmission mode, and a probability measure indicative of a likelihood of success of an attempt to identify and reserve sufficient capacity on a route from the transmitting node to the intended destination;

the apparatus further comprising one or more interfaces associated with the transmitting node, the one or more interfaces being configured to forward data units of the flow received by the transmitting node to one or more intermediate nodes with the indication of the intended destination in the predetermined header portion of said data units, for subsequent forwarding according to the first transmission mode, in the event that the first transmission mode is selected;

the apparatus further being configured to initiate a route-identification process to identify and reserve sufficient capacity on a route from the transmitting node towards the intended destination for transmission of the data units of the flow according to the second transmission mode in the event that the second transmission mode is selected.

Further aspects of the present invention relate to a computer program product comprising computer program code to, when loaded into a computer system and executed thereon, cause the computer to perform the steps of a method according to the first aspect, and to preferably non-transient carrier media such as optical or magnetic storage devices or solid state storage devices etc. carrying such computer program products or processor implementable instructions.

The various options and preferred embodiments referred to above in relation to the first aspect are also applicable in relation to the second and further aspects.

BRIEF DESCRIPTION OF THE DRAWINGS

A preferred embodiment of the present invention will now be described with reference to the appended drawings, in which:

FIG. 1 shows a data communication network;

FIG. 2 shows an intermediate node within the data communication network of FIG. 1;

FIG. 3 shows a transmitting node within the data communication network of FIG. 1, operable to perform a method according to a preferred embodiment;

FIG. 4 is a plot illustrating the efficiency gain from using a "smart" decision engine in a method according to an embodiment;

FIG. 5 is a plot illustrating a modifier for a "SuperSmart" decision function, showing a possible shape of a sigmoid function suitable as a probability function suitable for use in a method according to a preferred embodiment;

FIG. 6 is a 3D plot showing performance variation in the Pc×β space;

FIG. 7 is a plot illustrating the relative efficiency gains from using "dumb", "smart" and "SuperSmart" decision engines according to simulations;

FIGS. 9, 10 and 11 illustrate interactions that may occur between nodes in three different scenarios, and costs (in terms of resource usage) of transmitting a flow using a connectionless packet-switched transmission mode (FIG. 9), of transmitting a flow using a connection-oriented circuit-switched transmission mode (FIG. 10), and of transmitting a flow using a connectionless packet-switched transmission mode having first unsuccessfully attempted to use a connection-oriented circuit-switched transmission mode (FIG. 11).

DESCRIPTION OF PREFERRED EMBODIMENTS OF THE INVENTION

Figure 8:
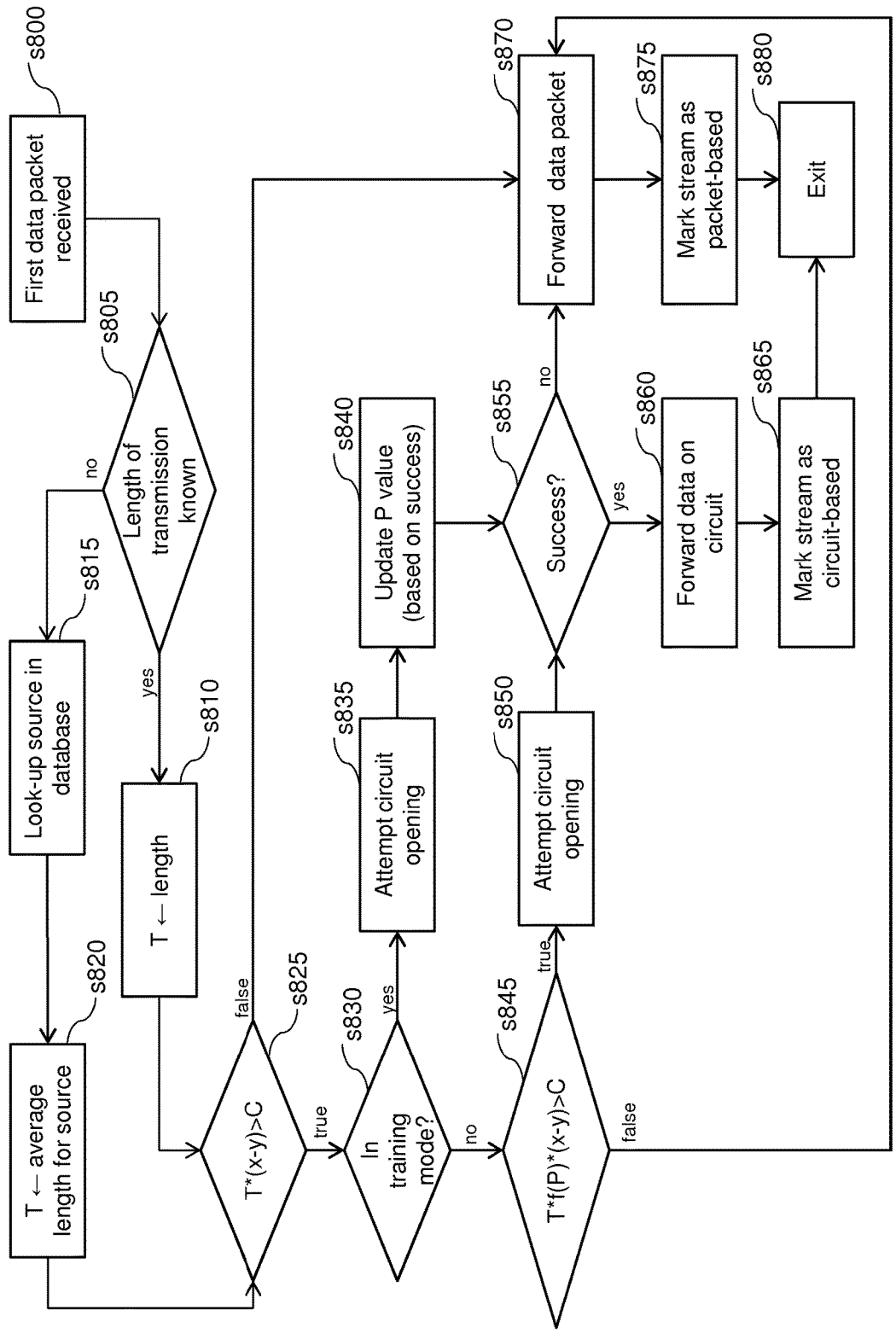
FIG. 8 is a flow-chart illustrating a method by which a transmitting node may select a transmission mode for a flow, according to a preferred embodiment.

With reference to the accompanying figures, methods and apparatus for forwarding data according to preferred embodiments will be described. Embodiments will be described mainly in relation to scenarios in which the primary decision to be taken is between using a connection-oriented circuit-switched (i.e. CO-CS) transmission mode and using a connectionless packet-switched (i.e. CL-PS) transmission mode, but as explained earlier, it will be appreciated that with other embodiments, the primary decision to be taken may be between using a connection-oriented packet-switched (i.e. CO-PS) transmission mode and using a connectionless packet-switched (i.e. CL-PS) transmission mode. In both cases, it will be appreciated the decision is one between using a connection-oriented transmission mode (e.g. CO-CS or CO-PS) and using a connectionless transmission mode (e.g. CL-PS).

FIG. 1 shows a data communication network 10—in this case, a packet network—comprising a number of intermediate nodes 15a to 15g each capable of forwarding data units (e.g. packets) in a connectionless packet-switched mode (i.e. CL-PS), and also capable of forwarding data in a connection-oriented circuit-switched mode (i.e. CO-CS). While such a network 10 would generally link a large number of end-users capable of acting as senders and/or receivers of data, and/or a number of other networks (again capable of acting as senders and/or receivers of data), via a large number of attachment points, FIG. 1 shows one end-user machine 11 acting as a source of data, and another end-user machine 19 acting as the intended destination of data sent from end-user machine 11.

End-user machine 11 is shown as being connected to an attachment node 13 in the network 10 via a data link 12. End-user machine 19 is shown as being connected to an attachment node 17 in the network 10 via a data link 18. When end-user machine 11 acting as a source, sending data with end-user machine 19 as the intended destination, node 13 may act as the transmitting node 13 for the data on behalf of source machine 11, while node 17 may act as the receiving node 17 for the data on behalf of destination machine 19 (although it will be appreciated that source machine 11 and transmitting node 13 may in fact be co-located, and similarly that destination machine 19 and receiving node 17 may be co-located).

A number of possible end-to-end paths exist between the transmitting node 13 and the receiving node 17, via hops (shown by dashed lines) between the intermediate nodes 15a to 15g of the network 10.

Each of the network nodes (i.e. whether acting as transmitting, intermediate or receiving nodes) may be a node such as a switch and/or router having the following components: one or more central processor units (CPUs) communicatively connected to one or more data stores or memories and to one or more input/output (I/O) interfaces via one or more data buses. The data stores can be any read/write storage devices or combination of devices such as random access memory (RAM) or non-volatile storage devices, and can be used for storing executable and/or non-executable data. The I/O interfaces are interfaces to other nodes for the receipt of data therefrom and/or the forwarding of data thereto. The end-user machines may have similar functional components to the network nodes, and may also have input/output devices for interfacing with users. Examples of such I/O devices include keyboards, a mouse/trackball devices, displays (e.g. monitors), etc.

In order to explain the respective functionalities of the network nodes, they will now be described in terms of their functional modules, noting that these functional modules may in fact be implemented in those nodes by virtue of the components described above (i.e. the CPUs, data stores, interfaces and data buses).

The specific functionality of a node acting as an intermediate node 15 will later be discussed with reference to FIG. 2 and that of a node acting as a transmitting node 13 will be discussed with reference to FIG. 3, but before that, the theoretical model underlying embodiments of the presently-disclosed techniques will be discussed with reference to FIGS. 4 to 7.

Modelling of Connectionless Packet-Switched and Connection-Oriented Circuit-Switched Transmission Modes The cost of transmitting data in a CL-PS mode over a packet-switching network is essentially a linear function of the number of packets (i.e. in first approximation, and notwithstanding retransmission due to packet loss, the volume of data) and of the number of hops between the source and the destination. The cost of transmitting data in a CO-CS mode over a circuit also includes a contribution proportional to the volume of traffic and number of hops, but to this must be added the cost of determining and opening the circuit (i.e. coordinating the nodes that are to act as switches on the path). This also applies when data is to be transmitted in a CO-PS mode.

In a first approximation, forwarding a packet in a CO-CS mode along a circuit doesn't have any significant processing cost (in terms of energy used, processing required or other such use of network resources) once the circuit is established. This contrasts with connectionless packet-switching where the destination of every packet must be read (from the packet header) and interpreted so that the packet can be sent toward its intended destination. The reason why the cost of circuit-based transmission is also linearly proportional to volume and path length is that energy is used for each unit of data that is physically transported between nodes.

Assuming however that data is transmitted at a constant average rate (ensuring proportionality between volume and duration), the cost (again in terms of energy used, processing required or other such use of network resources) of maintaining and using a circuit per unit of time/data is lower than the cost of forwarding the corresponding number of packets. As a result, opening a circuit is beneficial if and only if the data stream is sufficiently long for the lower cost per unit of time/data to offset the upfront cost of establishing a circuit. This can be formulated as follows:

$$T*(x-y) > C \quad [1]$$

where T is the duration/length of the stream, x is the cost of packet transmission (per time unit), y is the cost of circuit maintenance (per time unit) and C is the cost of opening the circuit.

There is however a critical difficulty: C is an upfront cost that must be incurred every time an attempt is made at creating a circuit, irrespective of whether the attempt is successful or not. This means that the decision is only straightforward if the probability of success is 1 (in which case it amounts to solving the inequality [1]), which is never the case in a real network, because the necessary resources may not be available at every point along the path between the source and the intended destination.

In practice, if an attempt is made and fails, one is left with no alternative but to try and transmit the data using the (default) connectionless packet-switching protocol, and upfront cost C is a total loss. So in order to make a rational decision as to whether to make the attempt or not, some measure of the probability of success P should be factored in, as per:

$$T*(x-y)*P > C \quad [2]$$

One problem is of course that P is not a straightforward variable to measure or estimate, as it typically depends on how much traffic is traversing the network, which varies depending on parameters such as time of day (e.g. peak vs. off-peak), route, and source and destination characteristics. This can however be remedied by allowing the network to "train" over a certain amount of time, using simple machine-learning techniques to infer the value of P on different routes and at different times of day.

For instance, every ingress node could base its decision on expression [1] for a fixed period of time, record its success rate in the form of a table such as that shown in Table 2 and use this value for P once the system goes "live" (i.e. starts using the "smart" probabilistic expression [2]).

TABLE 2

Probability of Success P for Different Routes at Different Times

|  | Peak | Off-peak |
|---|---|---|
| Route 1 | P = 0.25 | P = 0.75 |
| Route 2 | P = 0.4 | P = 0.6 |

In simulations (discussed below), a finer-grained table with 24 different time-segments and 10 different routes for each ingress point was used. Every route featured a varying success rate following a sine-wave function over a 24-hour period, with a random offset of up to a quarter of a period between routes.

Simulation Results and Performance Comparison

A simulation study was conducted to determine how much could be gained by making a per-session decision about whether to attempt to open a circuit. The following values were used for cost parameters: C=1, x=0.1 and y=0.01. As can be calculated using expression [1] above, for P=1, this means that the critical session duration above which it becomes advantageous to open a circuit is $T_c=1/(0.1-0.01)=1/0.09=11.11$. Average session durations varying between 1 and 200 were tested, with the actual length of every individual session being randomly determined so as to ensure that the overall frequency distribution (number of sessions as a function of duration) can be closely approximated by an exponential.

Initially a "dumb" decision based on expression [1] was compared with a "smart" version based on expression [2]. A typical result is shown in FIG. 4, which is a plot of the efficiency gain from using the above "smart" rather than "dumb" decision engines. This demonstrates that the benefits are maximised when average session duration is short, i.e. in the vicinity of the critical threshold $T_c$. This is intuitively understandable: as session length increases, the advantage of opening a circuit is so substantial in case of success that it completely outweighs the cost of a failed attempt. This all but nullifies the benefits of using the "smart" function for higher average durations ($T >> T_a$). It is also worth noting that for very low values of T, the benefit of using the probabilistic version may actually be slightly negative.

From these results, it may be seen that the "smart" algorithm could be further improved. Indeed, the fact that the gain in performance varies as a function of various parameters such as session length but also average probability of success suggests that a non-linear relationship between the latter and the likelihood of attempting circuit creation could yield better performance.

From experiments with several candidate functions, a function (hereafter referred to as "Super Smart") was identified that significantly outperforms a decision underpinned by expression [2]. It consists in replacing the P multiplier by a special kind of sigmoid function:

$$T*(x-y)*f(P) > C \quad [3a]$$

$$f(P) = 1 - \frac{1}{1 + \left(\frac{P}{P_c}\right)^{\beta}} \quad [3b]$$

Note that while the question: "Is $T*(x-y)*f(P)>C$?" is generally applicable in scenarios where the duration of the transmission is likely to be the same or similar in either mode, the duration might be mode-dependent, in which case respective values T1 and T2 may be used as respective estimates of duration for the respective modes. The question may then be expressed as: "Is $((T1*x)-(T2*y))*f(P)>C$?"

Since there are only two parameters in expression [3b], the threshold value $P_c$ for which f(P) reaches 0.5 and the nonlinearity β that determines the slope of the curve around this value, it was possible to conduct a systematic exploration of the parameter space and identify optimal values for the tested combination of cost parameters (C=1, x=0.1 and y=0.01).

Values of $P_c$ ranging between 0.05 and 0.5 by increments of 0.05 and values of β ranging between 1 and 10 by increments of 1 were tested. The best performance was found for $P_c=0.25$ and β=3. FIG. 5 (which shows a modifier for the "SuperSmart" decision function) shows the shape of the sigmoid curve for these parameter values. FIG. 6 shows a plot of "Performance variation in the Pc×β space (where higher values are better). Precise values are a function of the cost C, to open a circuit.

FIG. 7 like FIG. 4 is a plot of "Efficiency Gain Comparisons", but this time comparing "dumb" vs. "smart", "dumb" vs. "Super Smart" and "smart" vs. "Super Smart", with the latter using the identified optimum parameters values ($P_c$=0.25 and β=3). It will be noted that the negative benefit for very low values of T disappears for the "Super Smart" version, while peak performance (reached for T~$T_c$) shows an improvement of more than 5% over the "dumb" version (compared to 1.5% only for "smart" over "dumb").

Before proceeding to a detailed explanation of the functionality of nodes according to preferred embodiments, it may be noted that the decision as to which transmission mode to use need not be taken in dependence on a value for T (i.e. an estimate of the duration required to transmit the data units of the flow) and values for x and y (i.e. estimated rates of resource usage per unit time according to the respective transmission methods). Instead, the decision as to which transmission mode to use could involve, for example, obtained estimates of the number of packets N in the flow, or some other such measure of "volume of data" V of the flow, with the estimated "per unit time" values x and y being replaced by estimated values x' and y' for resource usage "per packet", or by estimated values x" and y" for resource usage "per unit volume of data" for the respective transmission methods. Such variants would result in decisions being based instead on comparisons such as the following:

Is $N*(x'-y')*f(P)>C$?

or Is $V*(x"-y")*f(P)>C$?

As with time-based options where the estimates (T1 and T2) of duration may differ for the respective modes, the estimated numbers (N1 and N2) of data units or volumes (V1 and V2) of data in the respective transmissions might be mode-dependent, with decisions being based on comparisons such as the following:

Is $((N1*x')-(N2*y'))*f(P)>C$?

or Is $((V1*x")-(V2*y"))*f(P)>C$?

This could be because a packet-based transmission might be associated with a certain packet loss rate prompting retransmission, while a route-based version might ignore errors and not resend lost data, leading to N1>N2, or V1>V2, for example.

It will thus be appreciated that the quantities on which the decision as to which transmission mode should be used for a flow may depend may be generalised to:

(i) a measure of the estimated difference D between the amount of the predetermined resource required to transmit the data units of the flow from the transmitting node to the intended destination according to a connectionless packet-switched transmission mode and the amount of the predetermined resource required to transmit the data units of the flow from the transmitting node to the intended destination on an already-identified route according to a connection-oriented circuit-switched transmission mode;

(ii) a resource-usage measure C indicative of an amount of the predetermined resource estimated to be used in an attempt to identify and set up a route from the transmitting node to the intended destination and to reserve sufficient capacity on said route for transmission of said flow according to the connection-oriented circuit-switched transmission mode; and (iii) a probability measure P indicative of a likelihood of success of an attempt to set-up a route for connection-oriented circuit-switched transmission from the transmitting node to the intended destination.

The decision could then be based on the following more generalised comparison:

"Is $D*f(P)>C$?"

According to individual variants or embodiments, the difference D could be obtained from:

(a) a "time to transmit" estimate T (or respective "time" estimates T1 and T2) and "resource usage rate estimates" x and y, i.e. "Is $T*(x-y)*f(P)>C$?"

(or "Is $((T1*x)-(T2*y))*f(P)>C$?" where the time estimates are mode-dependent).

(b) a "number of data units" estimate N (or respective "number" estimates N1 and N2) and "resource usage per data unit" estimates x' and y', i.e. Is $N*(x'-y')*f(P)>C$?

(or "Is $((N1*x')-(N2*y'))*f(P)>C$?" where the number estimates are mode-dependent);

(c) a "volume of data" estimate V (or respective "volume" estimates V1 and V2) and "resource usage per unit volume" estimates x" and y", i.e. Is $V*(x"-y")*f(P)>C(\ )$?

(or "Is $((V1*x")-(V2*y"))*f(P)>C$?" where the volume estimates are mode-dependent);

or on estimated values in respect of other factors known to be indicative of the estimated difference D between the amount of a particular resource required to transmit the flow according to a connectionless packet-switched transmission mode and the amount of the resource required to transmit the flow on an already-identified/set-up route according to a connection-oriented circuit-switched transmission mode.

The following explanation will relate to the first, i.e. "time-based", variant, in which the values are based on non-mode-dependent expected durations T for transmission, and respective resource usage rate estimates x and y, but it will be appreciated that variants making decisions based on mode-dependent or non-mode-dependent "number of data units" estimates N (option (b) above) or "volume of data" estimates V (option (c) above), or on estimates of other quantities, are equally applicable.

Functionality of Nodes According to Preferred Embodiments

The specific functionality of a node acting as an intermediate node 15 will now be discussed with reference to FIG. 2 and that of a node acting as a transmitting node 13 will be discussed with reference to FIG. 3.

Referring to FIG. 2, an intermediate node 15 is shown. Specifically, intermediate node 15$d$ is shown, having single-hop links (shown by thick dashed lines) to intermediate nodes 15$a$, 15$c$, 15$e$ and 15$g$. The functionality of intermediate node 15$d$ will be explained primarily in relation to data flowing in the direction from source 11 to destination 19, meaning that data units are generally received by intermediate node 15$d$ from intermediate nodes 15$a$ and/or 15$c$, and are generally forwarded by intermediate node 15$d$ to intermediate nodes 15$e$ and/or 15$g$, but it will be understood that data may equally well be passing intermediate node 15$d$ in the opposite direction, or between other forwarding and receiving nodes.

As will be explained, intermediate node 15$d$ (like some or all of the intermediate nodes 15) is capable of receiving data units being forwarded in a packet-switching mode or in a circuit-switching mode, of recognising from a characteristic of data units it receives whether data units are part of a flow being forwarded in a packet-switching mode or in a circuit-switching mode, and of processing and forwarding the data units accordingly, in dependence on whether they are part of a flow being forwarded in a packet-switching mode or in a circuit-switching mode.

The characteristic of data units that indicates to an intermediate node whether the data units are part of a flow being forwarded in a packet-switching mode or in a circuit-switching mode may be one or more of a number of characteristics. It may be an explicit label, or one or more codepoints in the header of (or otherwise associated with) the data units of the flow. It may on the other hand be the manner in which the data is conveyed to the intermediate node, e.g. the frequency or wavelength of the channel over which it is carried, the timeslot within the carrier signal used for the data units, or the encoding protocol used for transmission of the data units on the link to the node concerned, for example. It may be the source or destination port number or address used for the data units, or other such addressing information used for the data units. It will be appreciated that any of the above or other types of mode-indicating characteristic may be chosen or used to signal to intermediate nodes receiving data units which transmission mode has been selected for those data units, or for the flow of which they form a part. In cases where the mode selected is a connection-oriented circuit-switched mode, the same or a different characteristic may also indicate the already-identified route, thereby signalling to each intermediate node the appropriate "next-hop" node to which data units should be forwarded.

Packets from intermediate nodes 15*a* and/or 15*c* are received via the I/O interfaces 150 of intermediate node 15*d* and passed to the multiplexer/de-multiplexer 151. Depending on the form of the mode-indicating characteristic, the transmission mode selected for the data units may be identified by the I/O interfaces 150 or by the multiplexer/de-multiplexer 151. Based on the mode, the multiplexer/de-multiplexer 151 then passes data units on to the appropriate internal processing modules.

For packets having an indication that they are part of a flow being sent in a connectionless packet-switched mode, they are passed to a packet processor 152, at which information from the headers of the packets (including the destination address) is read and passed to the CPU 154 of the node 15*d*. Based on the destination address for each packet, and generally on other header information, as well as routing information such as routing tables, locally-stored in memory 155, a "next-hop" node is chosen for each packet. The packet processor 152 then passes the packets to multiplexer/de-multiplexer 158 to be forwarded from I/O interfaces 159 towards the chosen "next-hop" node, which in the case of intermediate node 15*d* may be intermediate node 15*e* or 15*g*.

For data units having an indication that they are part of a flow being sent in a connection-oriented circuit-switched mode, they are passed to a circuit switch 156. Generally, for data units of a flow being sent in a connection-oriented circuit-switched mode, a route will already have been identified for those data units, so only minimal processing will be required at a circuit management module 157. (The circuit management module 157 is shown as being linked to the CPU 154 of the node, however, because the two modules may well need to interact during a route-identification and set-up procedure prior to the forwarding of the data units of the flow.) The circuit management module 157 identifies from the mode-indicating characteristic or from a separate indication which is the identified "next-hop" node for the data units and passes them to multiplexer/de-multiplexer 158 to be forwarded from I/O interfaces 159 towards the chosen "next-hop" node.

Now that the functionality of a node acting as an intermediate node 15 has been discussed, the functionality of a node acting as a transmitting node 13 will be discussed.

Referring to FIG. 3, transmitting node 13 is shown. Transmitting node 13 has a single-hop link 12 to a user via source node 11, and is shown also as having a single-hop link 12' to another possible source node 11'. It may also have links to other users, nodes or networks, symbolised by node 15*h*, as it may be functioning as an intermediate node in respect of some paths across the network, as well as a "first-hop" attachment-point node for sources 11 and 11'.

As with the functionality of intermediate node 15*d*, the functionality of transmitting node 13 will be explained primarily in relation to data flowing in the direction from source 11 to destination 19, meaning that data units are generally received by transmitting node 13 from source node 11, and are generally forwarded to intermediate nodes 15*a* and/or 15*b*, but it will be understood that data may equally well be passing transmitting node 13 in the opposite direction, or between other forwarding and receiving nodes.

Transmitting node 13 receives data units (generally packets) from source 11 via the I/O interfaces 130 and passes them to packet processor 132 via the multiplexer/de-multiplexer 131. The packet processor 132 reads the header of each packet and checks its cache of packet information 133 to see if the packet is part of an existing flow. If the packet is part of an existing flow, the packet is forwarded in the manner already determined for the flow (i.e. if already determined to be forwarded in a connection-oriented circuit-switched mode via an already-identified route, via the circuit switch 136 to the multiplexer/de-multiplexer 138 to be forwarded from I/O interfaces 139 towards the chosen "next-hop" node on that route; if already determined to be forwarded in a connectionless packet-switched mode, to the multiplexer/de-multiplexer 138 to be forwarded from I/O interfaces 139 towards a "next-hop" node chosen following processing by the CPU 134 based on the destination address and/or other information in the packet header, with reference to routing tables and possibly other information stored in the node's main memory 135).

If the header of a packet indicates that the packet is not part of an existing flow, the header information (at least) is passed to the node's CPU 134. The CPU 134 then determines, using a process to be discussed in more detail later (with reference to FIGS. 8 to 11), whether the flow of which the packet forms a part is to be forwarded in a connectionless packet-switched mode or in a connection-oriented circuit-switched mode.

If a connectionless packet-switched mode is selected for the flow, CPU 134 performs a "next-hop" look-up process using routing tables and other information stored in the node's main memory 135, adds information concerning the flow to the packet information cache 133, then forwards the packet (and subsequent packets of the flow) to an appropriately-selected "next-hop" node (intermediate node 15*a* or 15*b* in the network of FIG. 1) in dependence on each packet's header information.

If a connection-oriented circuit-switched mode is selected for the flow, CPU 134 triggers a circuit set-up process, which is performed by the circuit management module 137. If the circuit set-up process is successful, the circuit switch 136 is configured accordingly to forward the packet and all subsequent packets of the same flow using the identified circuit, and the packet information cache 133 is updated accordingly. Each packet (or other such data unit) of the flow is then forwarded to the next node in the circuit in a manner that provides an indication to the next node that those packets are part of a flow being sent in a connection-oriented circuit-switched mode and for which a route has already been identified, allowing the next node to process them simply as data units to be forwarded along that route in the circuit-switched mode.

If a circuit set-up process is triggered but is ultimately unsuccessful, the CPU 134 may then re-designate the flow as a flow to be forwarded in a connectionless packet-switched mode, update the packet information cache 133 accordingly, and perform a "next-hop" look-up process for the packet concerned (and each subsequent packet of the flow) as if for a packet for which the packet-switched mode had initially been selected (as described above), before forwarding each packet to an appropriately-selected "next-hop" node in dependence on each packet's header information. It will be appreciated that some processing resources, energy and other resources will have been used in the unsuccessful attempt at setting up the circuit, however.

Transmission Mode Selection Process According to Preferred Embodiments

Referring to FIG. 8, this is a flow-chart for a method by which a node acting as a transmitting node (e.g. transmitting node 13) may select a transmission mode for a flow, according to a preferred embodiment. The flowchart includes steps of what is referred to as a "training mode", in which initial or default probability values P are determined which can subsequently be used in a full operational mode. To avoid unnecessary complexity, this flow-chart shows the steps performed once it has been determined (e.g. by virtue of the packet processor 132 of transmitting node 13 in FIG. 3 checking the header information of a packet received from source 11 against information stored in the packet information cache 133) that a received packet is the first packet received of a flow intended to be transmitted across the network.

Once a packet has been received (step s800), a determination is made as to whether an estimated value for the expected duration of the transmission of the flow in question is known (step s805), as this is used to inform the transmission mode decision.

Information about the expected duration and/or number of data units, and/or traffic volume of the transmission may be known if, for example, it has been reported explicitly by the source, or from information such as the content type (e.g. video stream) and origin/endpoint (e.g. media server), or if the file-size is known, e.g. when downloading a game or other software from a software store, or if it has been guessed or predicted after consulting a database (i.e. of average lengths of transmission for particular sources, ranges of IP addresses etc.). Populating such a data-base may be part of the process itself, i.e. as a training mode and/or as an ongoing part of a full operational mode. For instance, whenever a session ends, a record of its length (associated with a particular source, destination, time of day etc.) may be entered in the database for future use.

If it is determined at step s805 that an estimated value for the length (and/or number and/or volume) of the transmission of the flow in question is known, this value is taken as value T (or N, or V) (step s810) and the process proceeds to step s825. If an estimated value is not known, a database (stored in memory on the node or elsewhere) may be consulted (step s815) to obtain an estimate, possibly based on the average length (or number, or volume) of previous transmissions from the same source, or based on the average length (or number, or volume) of previous transmissions of the same type, or otherwise), and this is taken as value T (or N, or V) (step s820), allowing the process to proceed to step s825. (References to "number of data units" or "volume" options will be dropped from now on, for simplicity.)

At step s825, a determination as to whether expected duration T is such that $T*(x-y)>C$ is made, where x is a default value for the cost of packet transmission (per time unit), y is a default value for the cost of circuit maintenance (per time unit) and C is a default value for the cost of opening (i.e. identifying and setting up) a circuit. If not, then the cost of attempting to open a circuit for the flow cannot be justified irrespective of the probability of success, so a connectionless packet-switched transmission mode is selected, and the packet is forwarded (step s870). The stream or flow of which the packet forms a part is designated as one for which the packet-switched transmission mode is appropriate (step s875) and the packet information cache 133 is updated accordingly. The transmission mode selection process is then complete for that flow (step s880)—subsequent packets of the same flow are simply forwarded according to the packet-switched transmission mode, as described earlier.

If at step s825 a determination is made that expected duration T is such that $T*(x-y)<C$, the process proceeds to step s830, at which it is determined whether the process is operating in a training mode or in a full operational mode. If the process is operating in a training mode, a circuit set-up/opening procedure is attempted (step s835). Based on the success or failure of this, a value P for the probability of success of such a procedure is instantiated or updated (step s840), and the process proceeds to step s855.

If the circuit set-up/opening procedure was unsuccessful, it is decided that the flow of which the packet forms a part is one for which a connectionless packet-switched transmission mode is appropriate, and the process proceeds from step s855 to step s870. The packet is forwarded, the flow is designated as one for which the packet-switched transmission mode is appropriate (step s875), and the transmission mode selection process is then complete for that flow (step s880) as described before.

If, on the other hand, the circuit set-up/opening procedure was successful, it is decided that the flow of which the packet forms a part is one for which a connection-oriented circuit-switched transmission mode is appropriate, and the process proceeds from step s855 to step s860. The packet is forwarded on the selected circuit (step s860), the flow is designated as one for which the circuit-switched transmission mode is appropriate (step s865), and the transmission mode selection process is then complete for that flow (step s880).

If at step s830 it is determined that the process is operating in full operational mode rather than a training mode (i.e. because at least one value of P is already known), the process proceeds to step s845, at which stage a determination is made as to whether $T*(x-y)*f(P)>C$. In preferred embodiments, the function f(P) may be the function set out in (3b) above, or an alternative sigmoid function of P, but other functions may also be used.

As will be appreciated, the use of a sigmoid function is particularly appropriate. Basing the decision as to whether or not to attempt a circuit opening on a simple linear function of the probability of success (as with the "smart" algorithm described) is beneficial compared to using algorithms that do not take account of the probability of success at all, but the results are less than optimal because there is a "sharp" border between regions in which packet-based rather than circuit-based transmission is beneficial. A linear function essentially can cause the decision engine to take too many risks when the probability of success is low, and vice-versa. In other words: it can make the decision-making process "risk-prone" when the chances of success are low, and "risk-averse" when they are good. The result of this can be too many failed circuit-creation attempts (caused by the risk-prone strategy) and too many missed opportunities (caused by the risk-averse strategy), which can lower the system's ability to reduce resource usage overall. By making the outcome of the decision dependent on a non-linear, and preferably sigmoidal function of the probability of success, the system's ability to reduce resource usage overall can be increased. The chances of deciding to attempt to open a circuit drop quickly if P is low, reducing the direct penalty for failure, and increase quickly when P is high, thereby reducing the indirect cost of missed opportunities.

Returning to the flowchart, if it is found at step s845 that $T*(x-y)*f(P)>C$, this indicates that even with a known probability that a circuit set-up/opening procedure may fail, an attempt is justified in terms of resource usage, and an attempt is made (step s850).

If the attempted circuit set-up/opening procedure at step s850 is successful, the process proceeds from step s855 to step s860. The packet is forwarded on the selected circuit (step s860), the flow is designated as one for which the circuit-switched transmission mode has been selected (step s865), and the transmission mode selection process is then complete for that flow (step s880).

If the attempted circuit set-up/opening procedure at step s850 is unsuccessful, the process proceeds from step s855 to step s870. The packet is forwarded, the flow is designated as one for which a connectionless packet-switched transmission mode has been selected (step s875), and the transmission mode selection process is then complete for that flow (step s880).

FIGS. 9, 10 and 11 illustrate the interactions that may occur between nodes in three different situations, and are intended to illustrate costs (in terms of usage of resources) of transmitting a flow using a connectionless packet-switched transmission mode, transmitting a flow using a connection-oriented circuit-switched transmission mode, and transmitting a flow using a connectionless packet-switched transmission mode having first unsuccessfully attempted to use a connection-oriented circuit-switched transmission mode. In these figures, it will be noted that to avoid unduly cluttering up the figures, the term "cost" is used to refer to "usage of the resource in question", which may be the energy required to process data units at one or more network nodes, processing capacity at one or more processors on one or more of the network nodes, capacity on one or more links between the network nodes, a measure of a congestion allowance at network nodes and or on links between network nodes, or some other processing cost. While such "costs" tend to be combined "process-plus-transmission" costs, they have been attributed to the biggest source of that total cost to avoid unnecessary complexity.

FIG. 9 illustrates interactions that may occur between nodes in a scenario where P is known for the time period T for the flow and this results in a decision to use a connectionless packet-switched transmission mode. When the first packet is received at the first node (i.e. the transmitting node 13 in FIG. 1) from the source (i.e. source 11 in FIG. 1), the process described with reference to the flowchart of FIG. 8 is performed, a cost x is incurred in processing that packet at the first node, then, on the basis of the decision to transmit the flow using the packet-switched transmission mode, the packet is forwarded via each intermediate node 15 and the last node 17 to the destination, incurring a packet processing cost x at each node. Each subsequent packet of the flow is similarly forwarded, incurring a packet processing cost x at each node.

FIG. 10 illustrates interactions that may occur between nodes in a scenario where P is known for the time period T for the flow and this results in a decision to use a connection-oriented circuit-switched transmission mode. As before, when the first packet is received at the first node 13 from the source 11, the process described with reference to the flowchart of FIG. 8 is performed, then a prediction of the likely circuit characteristics is made. The first node 13 then initiates a circuit set-up/opening procedure, which involves circuit set-up requests being sent successively to each intermediate node 15 on the route to the last node 17 (which in the case of FIG. 1 is the attachment node for destination 19 so there is no circuit set-up cost for ascertaining the availability/suitability of that final hop), and set-up success responses being sent back via each node to the first node 13. A total circuit set-up cost C is incurred performing this process. On the basis of the decision to transmit the flow using the circuit-switched transmission mode, the data received so far for that flow is forwarded via each intermediate node 15 and the last node 17 to the destination, incurring circuit usage costs y for each hop. Subsequent data is sent when available, similarly incurring circuit usage costs y for each hop.

FIG. 11 illustrates interactions that may occur between nodes in a scenario where a decision to use a connection-oriented circuit-switched transmission mode results in a failure to set up a suitable circuit, leading to the flow being transmitted using a connectionless packet-switched transmission mode. The process proceeds as with that of FIG. 10 until the point at which the circuit set-up/opening procedure fails, a total circuit set-up cost C having been incurred. The process then proceeds as with that of FIG. 9, with packet processing cost x being incurred at each node for the first and each subsequent packet of the flow. In such cases, the information or database based on which the probability values P are determined should be updated in view of the failure.

It will be appreciated that total circuit set-up cost C may itself be variable and be determined based on past data or known information indicating the likely cost of an attempt to set up a circuit. This may depend on factors such as the geographical or topological distance from the transmitting node to the intended destination, or current network conditions, for example.

Insofar as embodiments described are implementable at least in part using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the invention has been described in relation to the above described example embodiments, the invention is not limited thereto and that there are many possible variations and modifications which fall within the scope thereof.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method of transmitting a flow comprising a plurality of data units across a data communication network from a transmitting node towards an intended destination via one or more of a plurality of intermediate nodes, data units of the flow having respective indications of an intended destination for data units of the flow, the intermediate nodes of the network being configured to receive data units, to identify from a characteristic of received data units a transmission mode that has been selected from at least two transmission modes for the data units, and to forward said data units according to the selected transmission mode, the transmission modes comprising:

a first transmission mode according to which a predetermined header portion of a received data unit is inspected following receipt by an intermediate node in order to obtain the indication of the intended destination for the received data unit, and whereby the received data unit is then forwarded by said intermediate node to a subsequent node selected by the intermediate node in dependence on the obtained indication of the intended destination; and a second transmission mode according to which a characteristic of a received data unit signals to intermediate nodes that the data unit is to be forwarded to a subsequent node on an already-identified route identified in dependence on the intended destination for data units of the flow, and whereby the received data unit is forwarded by each intermediate node to a subsequent node on the identified route;

the method comprising:

in respect of one or more data units of a flow to be transmitted from the transmitting node, obtaining a measure of the estimated difference between the amount of a predetermined resource required to transmit the data units of the flow from the transmitting node to the intended destination according to the first transmission mode and the amount of the predetermined resource required to transmit the data units of the flow from the transmitting node to the intended destination according to the second transmission mode;

at a processor associated with the transmitting node, selecting a transmission mode for the data units of the flow, the selection being made in dependence on the obtained measure of the estimated difference, a resource-usage measure indicative of an estimated amount of the predetermined resource required to be used in an attempt to identify a route from the transmitting node to the intended destination and reserve sufficient capacity on said route for transmission of said flow according to said second transmission mode, and a probability measure indicative of a likelihood of success of an attempt to identify and reserve sufficient capacity on a route from the transmitting node to the intended destination; and in the event that the first transmission mode is selected, forwarding data units of the flow received by the transmitting node to one or more intermediate nodes with the indication of the intended destination in the predetermined header portion of said data units, for subsequent forwarding according to the first transmission mode; and in the event that the second transmission mode is selected, initiating a route-identification process to identify and reserve sufficient capacity on a route from the transmitting node towards the intended destination for transmission of the data units of the flow according to the second transmission mode.

2. A method according to claim 1 wherein the step of obtaining a measure of the estimated difference comprises obtaining a first value indicative of an estimated rate of usage of the predetermined resource if transmitting the data flow according to the first transmission mode, a second value indicative of an estimated rate of usage of said predetermined resource if transmitting the data flow according to the second transmission mode, and an estimated time period required for the data flow to be transmitted when using the first and/or second transmission modes.

3. A method according to claim 1 wherein the step of obtaining a measure of the estimated difference comprises obtaining a first value indicative of an estimated usage of the predetermined resource per data unit if transmitting the data flow according to the first transmission mode, a second value indicative of an estimated usage of the predetermined resource per data unit if transmitting the data flow according to the second transmission mode, and an estimated number of data units in the data flow to be transmitted when using the first and/or second transmission modes.

4. A method according to claim 1 wherein the step of obtaining a measure of the estimated difference comprises obtaining a first value indicative of an estimated usage of the predetermined resource per unit volume of data if transmitting the data flow according to the first transmission mode, a second value indicative of an estimated usage of the predetermined resource per unit volume of data if transmitting the data flow according to the second transmission mode, and an estimated volume of data in the data flow to be transmitted when using the first and/or second transmission modes.

5. A method according to claim 1 wherein at least one of the resource-usage measures indicative of estimated amounts of the predetermined resource required to be used in attempts to identify routes and/or the probability measure indicative of a likelihood of success are obtained in dependence on one or more of: information obtained during a training mode; information obtained from another transmitting node; information obtained from a network control entity; information obtained from transmission of one or more previous flows; information obtained from one or more unsuccessful attempts to transmit one or more previous flows; attempts to identify and reserve sufficient capacity on routes from the transmitting node to an intended destination in respect of one or more previous flows.

6. A method according to claim 1 wherein at least one of the resource-usage measures indicative of estimated amounts of the predetermined resource required to be used in attempts to identify routes and/or the probability measure indicative of a likelihood of success are dependent on one or more of: a time period during which the transmission is requested; current or historical measures of congestion levels or other network characteristics in the network.

7. A method according to claim 1 wherein the selection of a transmission mode for the data units of the flow is made in dependence on a sigmoid function of a probability measure indicative of a likelihood of success of an attempt to identify and reserve sufficient capacity on a route from the transmitting node to the intended destination.

8. A method according to claim 1 wherein the data units are packets complying with a version of an Internet Protocol.

9. A method according to claim 1 wherein the characteristic of data units of a flow used to signal to intermediate nodes that the data units of the flow are to be forwarded to subsequent nodes on an already-identified route is a characteristic selected from: a label associated with the data units of the flow; one or more codepoints in a header portion of data units of the flow; a frequency, wavelength, timeslot, or encoding protocol used for transmission of the data units on links between nodes; a source or destination port number or address indication used for data units of the flow.

10. A method according to claim 1 wherein the predetermined resource is a resource selected from: energy required to process data units at one or more network nodes; processing capacity at one or more processors on one or more of the network nodes; capacity on one or more links between the network nodes; a measure of a congestion allowance at network nodes and or on links between network nodes.

11. A method according to claim 1 wherein the route-identification process initiated in the event that the second transmission mode is selected comprises the transmitting node sending requests to nodes on one or more routes in respect of available capacity and/or other network characteristics at the nodes and/or on links between the nodes on the one or more routes, and identifying a preferred route in dependence in responses to the requests received by the transmitting node.

12. A method according to claim 1 wherein the route-identification process initiated in the event that the second transmission mode is selected comprises the transmitting node requesting identification of a preferred route by a remote route identification entity.

13. A method according to claim 1 wherein the method further comprises forwarding data units of the flow with the first transmission mode as the selected transmission mode in the event that the second transmission mode is selected and that the route-identification process fails to identify and reserve sufficient capacity on a route from the transmitting node towards the intended destination for transmission of the data units of the flow according to the second transmission mode.

14. Apparatus for transmitting a flow comprising a plurality of data units across a data communication network from a transmitting node towards an intended destination via one or more of a plurality of intermediate nodes, data units of the flow having respective indications of an intended destination for data units of the flow, the intermediate nodes of the network being configured to receive data units, to identify from a characteristic of received data units a transmission mode that has been selected from at least two transmission modes for the data units, and to forward said data units according to the selected transmission mode, the transmission modes comprising:

a first transmission mode according to which a predetermined header portion of a received data unit is inspected following receipt by an intermediate node in order to obtain the indication of the intended destination for the received data unit, and whereby the received data unit is then forwarded by said intermediate node to a subsequent node selected by the intermediate node in dependence on the obtained indication of the intended destination; and a second transmission mode according to which a characteristic of a received data unit signals to intermediate nodes that the data unit is to be forwarded to a subsequent node on an already-identified route identified in dependence on the intended destination for data units of the flow, and whereby the received data unit is forwarded by each intermediate node to a subsequent node on the identified route;

the apparatus comprising:

one or more processors associated with the transmitting node operable to obtain, in respect of one or more data units of a flow to be transmitted from the transmitting node, a measure of the estimated difference between the amount of a predetermined resource required to transmit the data units of the flow from the transmitting node to the intended destination according to the first transmission mode and the amount of the predetermined resource required to transmit the data units of the flow from the transmitting node to the intended destination according to the second transmission mode;

the one or more processors further being operable to select a transmission mode for the data units of the flow, the selection being made in dependence on the obtained measure of the estimated difference, a resource-usage measure indicative of an estimated amount of the predetermined resource required to be used in an attempt to identify a route from the transmitting node to the intended destination and reserve sufficient capacity on said route for transmission of said flow according to said second transmission mode, and a probability measure indicative of a likelihood of success of an attempt to identify and reserve sufficient capacity on a route from the transmitting node to the intended destination;

the apparatus further comprising one or more interfaces associated with the transmitting node, the one or more interfaces being configured to forward data units of the flow received by the transmitting node to one or more intermediate nodes with the indication of the intended destination in the predetermined header portion of said data units, for subsequent forwarding according to the first transmission mode, in the event that the first transmission mode is selected;

the apparatus further being configured to initiate a route-identification process to identify and reserve sufficient capacity on a route from the transmitting node towards the intended destination for transmission of the data units of the flow according to the second transmission mode in the event that the second transmission mode is selected.

15. A non-transitory computer-readable storage medium storing computer program code to, when loaded into a computer system and executed thereon, cause the computer to perform the steps of a method of transmitting a flow comprising a plurality of data units across a data communication network from a transmitting node towards an intended destination via one or more of a plurality of intermediate nodes, data units of the flow having respective indications of an intended destination for data units of the flow, the intermediate nodes of the network being configured to receive data units, to identify from a characteristic of received data units a transmission mode that has been selected from at least two transmission modes for the data units, and to forward said data units according to the selected transmission mode, the transmission modes comprising:

a first transmission mode according to which a predetermined header portion of a received data unit is inspected following receipt by an intermediate node in order to obtain the indication of the intended destination for the received data unit, and whereby the received data unit is then forwarded by said intermediate node to a subsequent node selected by the intermediate node in dependence on the obtained indication of the intended destination; and a second transmission mode according to which a characteristic of a received data unit signals to intermediate nodes that the data unit is to be forwarded to a subsequent node on an already-identified route identified in dependence on the intended destination for data units of the flow, and whereby the received data unit is forwarded by each intermediate node to a subsequent node on the identified route;

the method comprising:

in respect of one or more data units of a flow to be transmitted from the transmitting node, obtaining a measure of the estimated difference between the amount of a predetermined resource required to transmit the data units of the flow from the transmitting node to the intended destination according to the first transmission mode and the amount of the predetermined resource required to transmit the data units of the flow from the transmitting node to the intended destination according to the second transmission mode;

at a processor associated with the transmitting node, selecting a transmission mode for the data units of the flow, the selection being made in dependence on the obtained measure of the estimated difference, a resource-usage measure indicative of an estimated amount of the predetermined resource required to be used in an attempt to identify a route from the transmitting node to the intended destination and reserve sufficient capacity on said route for transmission of said flow according to said second transmission mode, and a probability measure indicative of a likelihood of success of an attempt to identify and reserve sufficient capacity on a route from the transmitting node to the intended destination; and in the event that the first transmission mode is selected, forwarding data units of the flow received by the transmitting node to one or more intermediate nodes with the indication of the intended destination in the predetermined header portion of said data units, for subsequent forwarding according to the first transmission mode; and in the event that the second transmission mode is selected, initiating a route-identification process to identify and reserve sufficient capacity on a route from the transmitting node towards the intended destination for transmission of the data units of the flow according to the second transmission mode.

16. The apparatus according to claim 14 wherein the resource-usage measures indicative of estimated amounts of the predetermined resource required to be used in attempts to identify routes is obtained in dependence on one or more of: information obtained during a training mode; information obtained from another transmitting node; information obtained from a network control entity; information obtained from transmission of one or more previous flows; information obtained from one or more unsuccessful attempts to transmit one or more previous flows; attempts to identify and reserve sufficient capacity on routes from the transmitting node to an intended destination in respect of one or more previous flows.

17. The apparatus according to claim 14 wherein the probability measure indicative of a likelihood of success is obtained in dependence on one or more of: information obtained during a training mode; information obtained from another transmitting node; information obtained from a network control entity; information obtained from transmission of one or more previous flows; information obtained from one or more unsuccessful attempts to transmit one or more previous flows; attempts to identify and reserve sufficient capacity on routes from the transmitting node to an intended destination in respect of one or more previous flows.

18. The apparatus according to claim 14 wherein the resource-usage measures indicative of estimated amounts of the predetermined resource required to be used in attempts to identify routes is dependent on one or more of: a time period during which the transmission is requested; current or historical measures of congestion levels or other network characteristics in the network.

19. The apparatus according to claim 14 wherein the probability measure indicative of a likelihood of success is dependent on one or more of: a time period during which the transmission is requested; current or historical measures of congestion levels or other network characteristics in the network.

20. The apparatus according to claim 14 wherein the selection of a transmission mode for the data units of the flow is made in dependence on a sigmoid function of a probability measure indicative of a likelihood of success of an attempt to identify and reserve sufficient capacity on a route from the transmitting node to the intended destination.

* * * * *